United States Patent
Nishi et al.

(10) Patent No.: US 7,050,076 B2
(45) Date of Patent: May 23, 2006

(54) OPTICAL STATE MODULATION APPARATUS, DISPLAY SYSTEM AND OPTICAL STATE MODULATION METHOD

(75) Inventors: Tomohiro Nishi, Tokyo (JP); Michihiro Ohnishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 512 days.

(21) Appl. No.: 10/458,158

(22) Filed: Jun. 9, 2003

(65) Prior Publication Data

US 2003/0227442 A1    Dec. 11, 2003

(30) Foreign Application Priority Data

Jun. 11, 2002    (JP) ............ P2002-170434

(51) Int. Cl.
*G09G 5/10*    (2006.01)
(52) U.S. Cl. .................. 345/690; 380/210
(58) Field of Classification Search ........ 345/690, 345/691, 89; 380/54, 211, 218, 210; 385/1, 385/4; 348/744; 359/237, 242
See application file for complete search history.

(56) References Cited

U.S. PATENT DOCUMENTS

| | | | |
|---|---|---|---|
| 5,680,454 A * | 10/1997 | Mead | 380/204 |
| 5,959,717 A * | 9/1999 | Chaum | 352/40 |
| 6,018,374 A * | 1/2000 | Wrobleski | 348/744 |
| 6,624,874 B1* | 9/2003 | Revelli et al. | 352/90 |
| 6,771,349 B1* | 8/2004 | Sitrick et al. | 352/85 |
| 6,861,640 B1* | 3/2005 | Light et al. | 250/221 |
| 2002/0191810 A1* | 12/2002 | Fudge et al. | 382/100 |

FOREIGN PATENT DOCUMENTS

| WO | WO 01 33846 | 5/2001 |
|---|---|---|
| WO | WO 01 56279 | 8/2001 |

* cited by examiner

*Primary Examiner*—Ricardo Osorio
(74) *Attorney, Agent, or Firm*—Frommer Lawrence & Haug LLP; William S. Frommer

(57) ABSTRACT

An optical state modulation unit is provided to apply an optical intensity modulation in temporal domain on a display image generated from an inputted image signal for different gray scale values such that the optical intensity modulation performed at least one of the gray scale values of the display image falls into a region at which the flicker is perceptible to human vision when a recorded image obtained by image-capturing the display image is viewed, while remaining imperceptible when the display image is directly viewed. The optical state modulation unit provides the optical intensity modulation such that the average optical intensity of the display image based on the image signal with the optical intensity modulation is the same as that of the display image generated from the image signal without the optical intensity modulation at each gray scale value.

44 Claims, 8 Drawing Sheets

F I G. 4
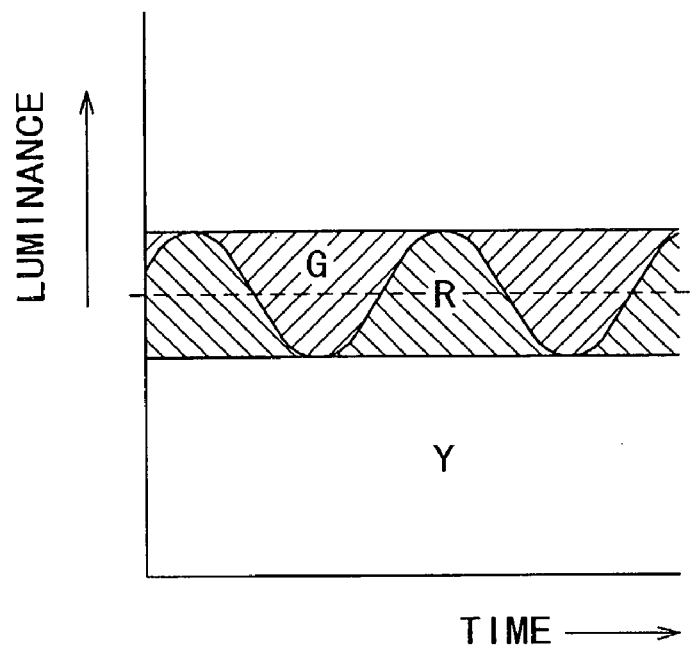
F I G. 5
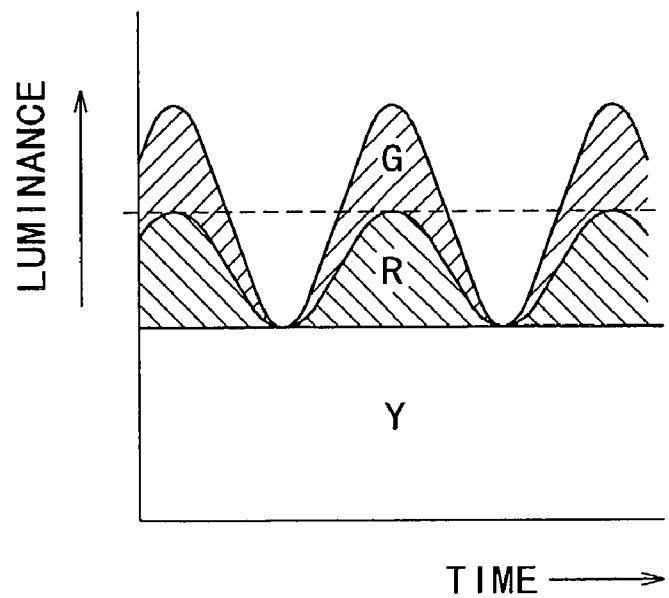

F I G. 1 3
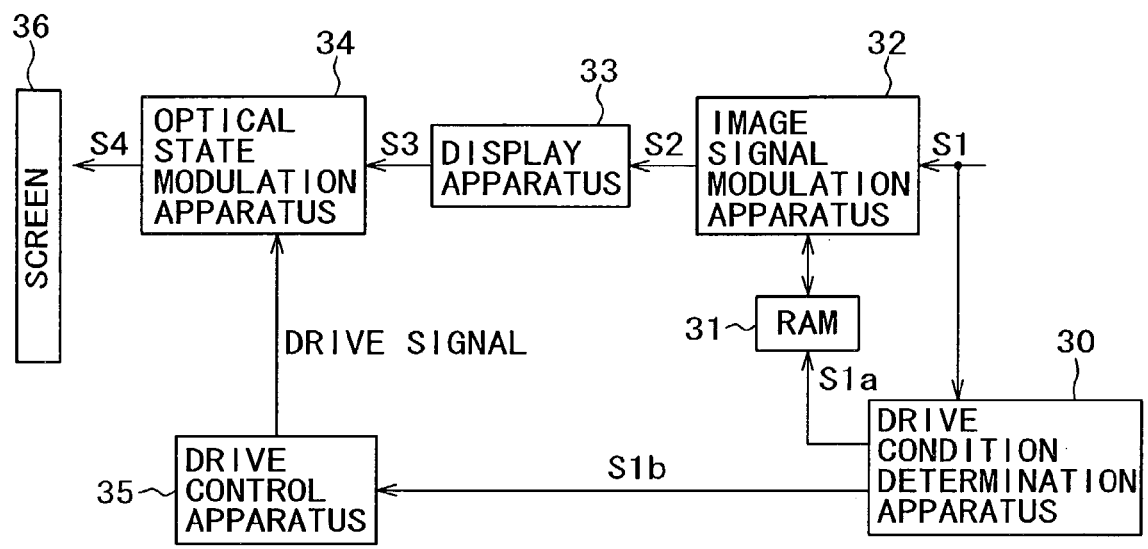
F I G. 1 4
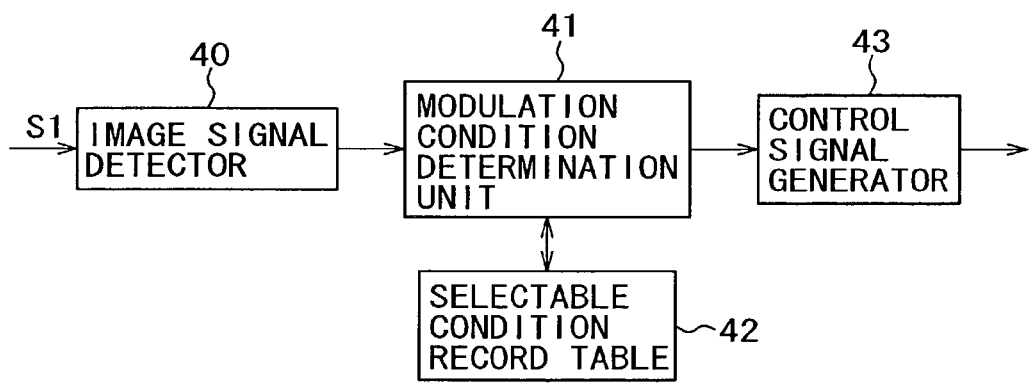
F I G. 1 5
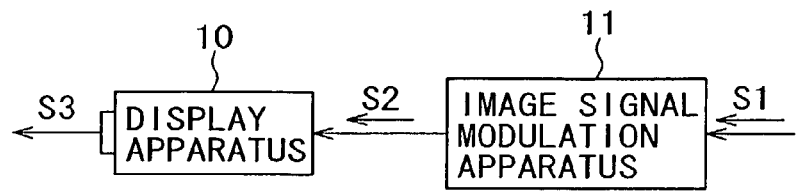

OPTICAL STATE MODULATION APPARATUS, DISPLAY SYSTEM AND OPTICAL STATE MODULATION METHOD

RELATED APPLICATION DATA

This application claims priority to Japanese Patent Application JP 2002-170434 filed on Jun. 11, 2002, and the disclosure of that application is incorporated herein by reference to the extent permitted by law.

BACKGROUND OF THE INVENTION

1. Field of the Invention

The present invention relates to an optical state modulation apparatus for applying an optical intensity modulation on an image displayed on a display screen so as to generate an optical state variation that is visible in a recorded image obtained through unauthorized image-capturing of the displayed image and interferes viewing of the recorded image. The present invention also relates to a display system and an optical state modulation method, which may be realized with the optical state modulation apparatus.

2. Description of the Related Art

A technology for preventing unauthorized recording of an image displayed on a display screen is disclosed in U.S. Pat. No. 6,018,374. The above technology disclosed in U.S. Pat. No. 6,018,374 takes into account the difference in imaging characteristic between human vision and an image-capturing camera, and utilizes infrared light as a means of preventing such unauthorized recording of the displayed image. Specifically, the above technology employs a system having an infrared light projector that is placed in the vicinity of an image projector or any other position far from the display screen. In the system, infrared light is projected from the infrared light projector to the display screen so as to allow infrared light reflected off the display screen to fall upon an image-capturing apparatus operated by a person who is conducting an image/video piracy. In other words, the system used in the above technology enables an infrared image unrelated to a feature film/video program image to be recorded in a recorded image obtained through the image/video piracy. Accordingly, a quality of the recorded image obtained through the image/video piracy may be damaged, and a location at which the image/video piracy has been conducted may be also identified, as the case may be. It is a matter of course that the infrared light is not perceived by the human vision, so that a viewer finds no difficulty in enjoying the viewing of the feature film/video image.

SUMMARY OF THE INVENTION

The means of using the infrared light as described above enables sufficient prevention and interfering effects to be accomplished. However, it is desirable to establish a variety of prevention and/or interfering technologies for protecting valuable image/video contents.

For example, a display system shown in FIG. 17 may be used to protect the image/video contents. A configuration and an operation of the display system in FIG. 17 are described in the following section.

The display system includes an optical state modulation apparatus 51 that applies an optical intensity modulation in temporal domain on a display image generated based on a inputted image signal S1, and a display apparatus 50 that converts an image signal S2 resulting from the optical intensity modulation performed by the optical state modulation apparatus 51 into a predetermined display image signal S3 and outputs the converted display image signal S3 to a display screen 52.

A variety of methods may be used to apply the optical intensity modulation on the image signal Si. In the present display system, there is provided a method for generating a plurality of identical frames with different optical intensities from a single frame and outputting these plurality of frames during a display period for the single frame. The single frame used herein is a unit of a display operation in the display apparatus.

The optical state modulation apparatus 51 is provided for generating an image signal S1$a$ and an image signal S1$b$ for two frames from the image signal S1 for a single frame, for instance, and applying the optical intensity modulation in the temporal domain on the generated image signals S1$a$ and S1$b$ to generate an image signal S2, which is then outputted to the display apparatus 50. The optical state modulation apparatus 51 provides the optical intensity modulation in such a way that an average optical intensity ((S1$a$+S1$b$)/2) of the two frames would be the same as the optical intensity of the display image generated from the original image signal S1.

The display apparatus 50 is provided for converting the inputted image signal S2 into the display image signal S3, and outputting the converted display image signal S3 to the display screen 52. In order to convert the image signal S2 composed of two frames into the display image signal S3 so as to output the converted display signal S3 to the display screen 52 during the display period for the single frame, the display apparatus 50 needs to generate the image signal output at a frame rate that is double an input frame rate. In the display apparatus 50, for instance, if an image signal for n frames were to be generated from the image signal S1 for a single frame with the optical state modulation apparatus 51, the image signal output would have a frame rate that is n times as much as the input frame rate.

As described above, the display system utilizes the display apparatus 50 for converting the image signal S2 resulting from the optical intensity modulation performed by the optical state modulation apparatus 51 into the display image signal S3 and outputting the converted display image signal S3 to the display screen 52. Accordingly, the display system provides the optical intensity modulation for generating the optical flicker that is perceptible to a human vision system when a recorded image, which is obtained by image capturing the image of the display image signal S3 displayed on the display screen 52 using an image-capturing apparatus, is viewed, while remaining imperceptible to the human vision system when the display image on the display screen 52 is viewed directly. As a result, the valuable image/video contents may be protected against the image/video piracy.

In the display system as described above, a modulation of a sinusoidal waveform is used for the optical state modulation apparatus 51 to apply the optical intensity modulation on a display image generated from an image signal. With this method using the modulation of the sinusoidal waveform, the optical intensity of the display image with the optical intensity modulation may be calculated with the following function F(f, t).

$$F(f,t)=A+\alpha A \times \cos(2\pi f t) \quad (1)$$

where A is an optical intensity of a display image generated from an image signal without the optical intensity modulation, f is a frequency of the modulation, $\alpha(0 \leq \alpha \leq 1)$ is a contrast and t is a time.

FIG. 6 is a graph showing a characteristic of the optical intensity of a display image generated from an image signal with respect to gray scale values of the display image when the optical intensity modulation is applied on the display image according to the above Equation 1. In the graph of FIG. 6, it is assumed that a modulation with the contrast α of 0.5 and the frequency f of 67.5 Hz is applied, and the gray scale are set to 256 levels. A gamma correction value is set to 2.2. The optical intensity of the display image generated from the image signal is scaled at the vertical axis of the graph. The optical intensity scaled at the vertical axis is an optical intensity level that is obtained by normalization in which the optical intensity of a display image with the maximum gray scale value without the optical intensity modulation is set to 1. A curve represented by a solid line A in the graph indicates a relation between the optical intensity level of the display image generated from the image signal without the optical intensity modulation and the corresponding gray scale value thereof. The optical intensity resulting from the optical intensity modulation performed at each gray scale value varies at a region shown by slanted lines. In this case, the optical intensity modulation is provided so as that the average value of the optical intensity obtained at each gray scale value satisfies the relation shown by the curve A. A region B above the curve A indicates a lighter optical intensity than the optical intensity of the display image generated from the image signal without the optical intensity modulation. On the contrary, a region C below the curve A indicates a darker optical intensity than the optical intensity of the display image generated from the image signal without the optical intensity modulation.

For example, if the optical intensity of the display image generated from the image signal without the optical intensity modulation is equivalent to the maximum output of the display apparatus (for example, 200 cd/m$^2$) when the image signal without the optical intensity modulation is at a gray scale value of 256 (maximum level), as shown in FIG. 6, an optical intensity modulation in the range of 100 cd/m$^2$ to 300 cd/m$^2$ at the gray scale value of 256 is required for the optical intensity output of the display image generated from the image signal with the optical intensity modulation. If this is the case, it is necessary to employ a display apparatus that may generate the optical intensity output up to a level of 300 cd/m$^2$. In other words, the display apparatus needs to generate output one and a half times as much as the required optical intensity output for the display apparatus in displaying an original image signal. Accordingly, a more expensive display apparatus than a normally available display apparatus is inevitably required.

In the above example, if a display apparatus other than the display apparatus that can generate the optical intensity output up to the level of 300 cd/m$^2$ is used, a characteristic of the optical intensity of the display image generated from the image signal with respect to gray scale values of the display image is changed as shown in a graph of FIG. 7. In the graph of FIG. 7, a curve representing the gray scale value of the image signal with the optical intensity modulation is provided in a shape different from a curve representing the gray scale value of the image signal without the optical intensity modulation. If the curves respectively representing the gray scale values of the image signals are different from each other before and after the optical intensity modulation, it is likely that a quality of an image signal presented for a viewer would be degraded.

The present invention is proposed in view of above described conditions. There is a need for an optical state modulation apparatus, a display system and an optical state modulation method, which ensure a protection of valuable image/video contents by providing an optical intensity modulation that generate, without losing the optical intensity of a display image generated from an image signal without the optical intensity modulation, the optical flicker that is perceptible to a human vision system when a recorded image obtained by image-capturing, using an image-capturing apparatus or the like, a display image generated from an image signal with the optical intensity modulation is viewed, while remaining imperceptible to the human vision system when the display image generated from the above-mentioned image signal is directly viewed.

According to an embodiment of the present invention, there is provided a technology for applying an optical intensity modulation having a periodicity in temporal domain on an original display image on single gray scale value basis in such a way that an optical state variation independent of the original display image becomes visible in a recorded image obtained by image-capturing of a displayed image, while presenting no interfering effect to the direct viewing of the displayed image. More specifically, a modulation technology is provided for generating interfering noise (optical state variation independent of the original display image) that is perceptible when a recorded image obtained by image-capturing of a displayed image using an image-capturing apparatus or the like is viewed, while remaining imperceptible when the displayed image is directly viewed without using any image-capturing apparatus.

The optical state variation may include a variation in light-dark contrast domain (luminance variation), a variation in color domain and/or a combination of these variations. Conditions that enable the above-mentioned optical state variation to be accomplished will be described below together with application examples using the above-mentioned modulation technology.

BRIEF DESCRIPTION OF THE DRAWINGS

The features and advantages of the present invention will become more apparent in the following description of the presently preferred exemplary embodiments of the invention taken in conjunction with the accompanying drawings, in which:

FIG. 4 shows an example of optical intensity modulation application in which a sum of luminance values of two different colors is constant, and the luminance values for two different colors vary and have opposing phases from each other;

FIG. 5 shows an example of optical intensity modulation application in which the optical intensity values for two different colors vary but have the same phase;

FIG. 13 shows a configuration example of a projection system (of projection light modulation type);

FIG. 14 shows a configuration example of a drive condition determination apparatus;

FIG. 15 shows a configuration example of a direct view system (of image signal modulation type);

DESCRIPTION OF THE PREFERRED EMBODIMENTS (A) Basic Principle (A-1) Human Visual Characteristic on Contrast Variation In one embodiment of the present invention, the focus is placed on a human visual characteristic in perceiving optical flickering. Temporal frequency contrast sensitivity of the human vision may be obtained by calculating a Michelson contrast (just referred to as "contrast" hereinafter) for various temporal frequencies, where the Michelson contrast is a contrast at which the human vision system may no longer perceive the flicker of light that is being modulated in sinusoidal fashion in temporal domain.

Figure 1:
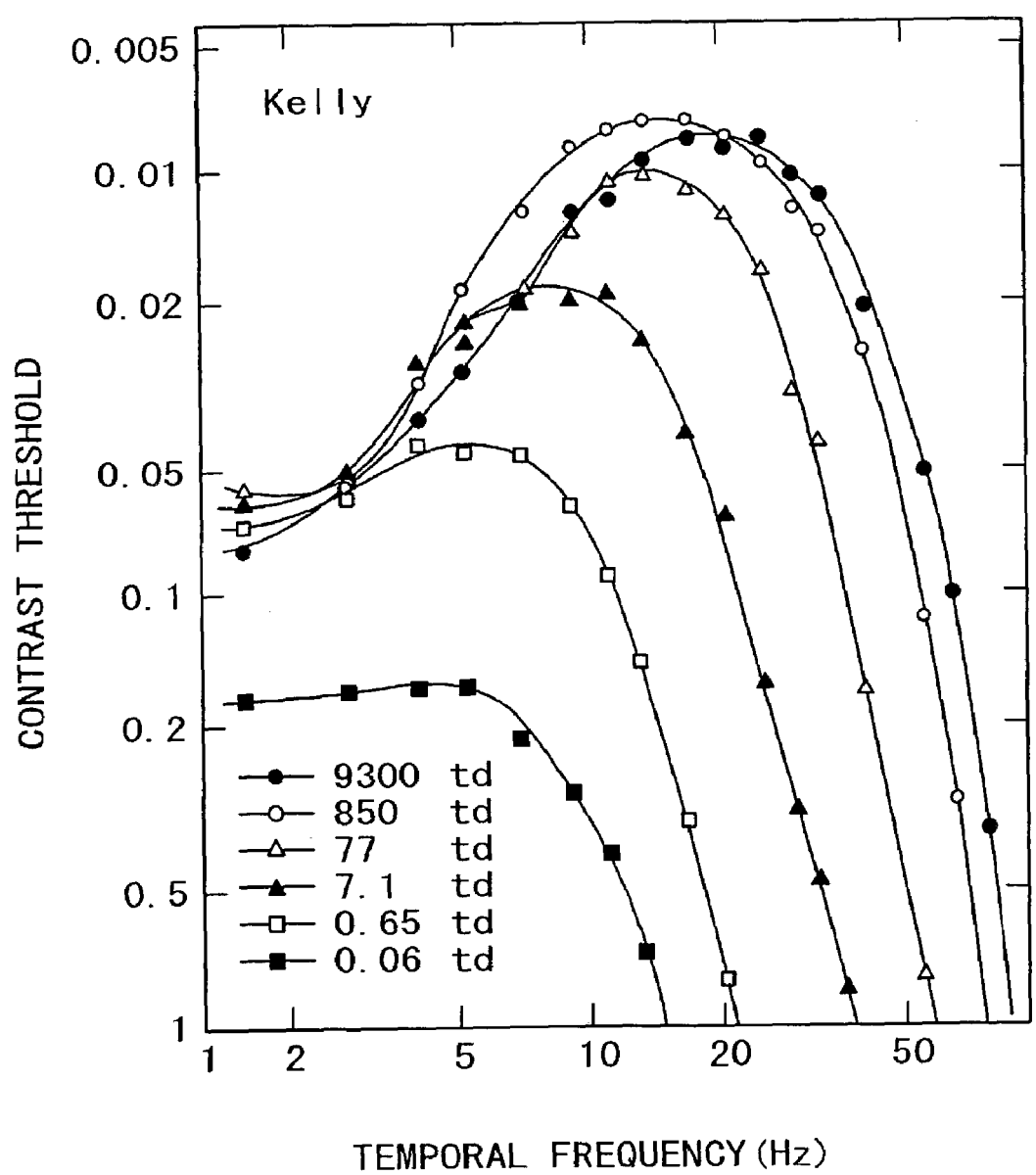
FIG. 1 is a graph showing a contrast sensitivity characteristic of human vision as a function of temporal frequency for different average luminance levels.

FIG. 1 is a graph showing the contrast sensitivity of human vision system as a function of temporal frequency for different average luminance levels. Specifically, FIG. 1 shows experimental results measured in various conditions to determine visibility of the flicker on a display screen when light-dark displays are repeated thereon. The contrast scaled at a vertical axis of the graph is a value of the amplitude divided by an average optical intensity, and specifically calculated by (Max−Min)/(Max+Min), where Max and Min are the maximum value and the minimum value of the amplitude, respectively. The temporal frequency scaled at a horizontal axis of the graph corresponds to a frequency of the light-dark (contrast) variation. Legend symbols in the figure such as ○ and ●, respectively, indicate corresponding groups of the measured results for different average luminance intensity levels of the display screen.

In the figure, the average luminance intensity level is expressed with a unit Troland (td) that is called a retinal illuminance. The unit of the average luminance intensity level corresponds to the luminous level at a retina of the human vision system. In other words, the unit "td" is equivalent to a value obtained by multiplying an area of pupil ($mm^2$) by luminance ($cd/m^2$). It is noted that 1000 td is equivalent to approximately 40 $cd/m^2$.

Each curve line passing through the same symbols in FIG. 1 represents a threshold boundary up to which the flicker of the corresponding average luminance intensity maybe perceived by the human vision system. The flicker may be perceived at a region below the boundary curve (i.e., a region corresponding to contrast sensitivities equal to or more than the temporal frequency contrast sensitivity of the human vision system). In contrast, the flicker may not be perceived at a region above the boundary curve (i.e., a region corresponding to contrast sensitivities less than the temporal frequency contrast sensitivity of the human vision system).

As shown in FIG. 1, the human vision sensitivity for the flicker peaks at a temporal frequency in the range of 10 to 20 Hz, at which frequency a slight change in contrast would be perceived more easily. Larger contrast variation is required for the flicker to be perceived at frequencies higher than the above peak range. For instance, the flicker becomes invisible when the average luminance intensity is of 77 td, even with a contrast variation of 100% at a temporal frequency of about 50 Hz. Instead, light with a constant optical intensity that is the temporal average of the flickering variation would be observed.

The above-mentioned human visual characteristic is exploited in display apparatuses such as a film movie projector, which uses a frame frequency of 48 Hz, and a television receiver with a CRT display, which uses a display frame frequency of 60 Hz, thereby displaying an image without any flicker.

(A-2) Modulation Condition (A-2-1) Modulation Condition That Presents no Visible Flicker To Viewer That is Directly Viewing Display Image on Display Screen First, a modulation condition is obtained under which the flicker would not be perceptible to the human vision system when a display image on a display screen is viewed directly. In order to obtain a basic condition to be satisfied in a modulation method of the present embodiment, a modulation of a sinusoidal waveform is applied on an image displayed with a uniform optical intensity on the display screen. In other words, a periodic optical intensity modulation applied on the display image on the display screen will be now described.

The optical state over time of the displayed image with the optical intensity modulation is expressed by the following function F(f, t).

$$F(f,t)=A\times(1-\alpha)+\alpha A\times\cos(2\pi ft) \quad (1)$$

where A is a constant, f is a frequency of the modulation, α is a constant ($0 \leq \alpha \leq 1$), and t is a time.

The first term on the right side of the Equation 1 represents the average optical intensity of the displayed image on the display screen, and the second term thereof represents a temporal modulation component to be added to the first term. Accordingly, the flicker in the displayed image on the display screen would not be perceptible to the human vision system, as explained in the previous section (A-1), if an amplitude of the temporal modulation (i.e., αA) is set at a value equal to or less than the amplitude, at which the flicker of the particular temporal modulation frequency f would no longer be perceptible, according to a calculation based on the temporal frequency contrast sensitivity of the human vision system at the luminance level of the displayed image.

In other words, the human vision system only perceives the displayed image having a constant optical intensity, represented as A×(1−α), on the display screen.

For instance, when the modulation described above is applied on a movie being shown in a movie theater, the optical intensity-modulated light of a constrast α of 20% and a temporal frequency f of 72 Hz needs to be applied on the displayed image projected onto the display screen, if all-white-screen of 40 cd/m² is used as the displayed image and displayed at a rate of 24 frame/second. The luminance of 40 cd/m² corresponds to the maximum luminance of a typical film image (approximately 1000 td).

A variety of methods may be utilized for applying the optical intensity modulation. One of the methods is to use a rotation filter having a sinusoidal density variation. The rotation filter is placed in front of a projector lens of a projection-type display apparatus (i.e., the so-called projector) or any other position along a projection optical path, and a rotate-able part of the rotation filter is rotated.

In the present embodiment, the sinusoidal modulation with the temporal frequency of 72 Hz and the contrast of 20% comes under the frequency and amplitude condition equal to or less than that of the temporal frequency contrast sensitivity of the human vision system. Accordingly, no visible flicker is presented to a viewer of the displayed image projected onto the display screen.

With the present method, the average luminance goes down because of the rotation filter. Specifically, in the present embodiment, the average luminance would be A(1−α) or 40×(1−0.2) or 80% of the original optical state A. Accordingly, the optical state of the displayed image projected onto the display screen would remain the same as the original brightness (40 cd/m²), if the original optical intensity of the displayed image were multiplied in advance by an inverse of (1−α), which is a reduction ratio by which the optical intensity goes down, in other words, the maximum luminance of the displayed image were adjusted in advance to 50 cd/m².

Such functionality may be accomplished by an image luminance adjustment means. The image luminance adjustment means calculates the above-mentioned reduction ratio on the basis of contrast information that is stored or being fed from the outside, and adjusts an optical source luminance according the calculated reduction ratio. Alternatively, the image luminance adjustment means may adjust an optical source luminance according to the reduction ratio that is stored or being fed from the outside.

The applicability of the method of applying the optical intensity modulation on the displayed image without presenting the visible flicker to the viewer is not limited to images displayed with the same average luminance intensity on the entire area of the display screen (e.g., all white screen). The same method may also be applied on a more typical image that has different levels of the average luminance intensity at various parts of the displayed image.

In the present embodiment, it is not always necessary to apply the optical intensity modulation on the entire area of the display screen at once. For instance, the phase of the optical intensity modulation may be varied at different positions (spatial positions) in the displayed image. Alternatively, different optical intensity modulations (different combinations of amplitude and frequency) may be applied on different positions (spatial positions) in the displayed image. As described above, optical intensity modulation information may be superimposed without presenting the visible flicker to the viewer of the displayed image. It is a matter of course that the above modulation method may be utilized in a similar manner for an optical intensity modulation that satisfies another condition which will be described in the following sections when the optical intensity modulation is applied on the displayed image.

Furthermore, in the present embodiment, the maximum luminance of the displayed image may be defined independently for different image scenes. For instance, an image scene having a lower maximum luminance may be subject to the optical intensity modulation (combination of amplitude and frequency) according to the lower maximum luminance. On the other hand, an image scene having a higher luminance may be subject to the optical intensity modulation (combination of amplitude and frequency) according to the higher maximum luminance.

As shown in FIG. 1, the contrast threshold does not vary significantly even when the luminance of the displayed image varies greatly. For instance, when the average luminance intensity changes from 850 td to 77 td, the corresponding contrast sensitivity curve only shifts from a characteristic curve represented by the symbol ○ to a characteristic curve represented by a symbol Δ. Furthermore, the higher the average luminance intensity is, the easier it is for the human vision system to distinguish the contrast variation. In practice, the modulation condition may be determined satisfactorily based on the maximum luminance (all white screen) for all of the image scenes.

The present embodiment has been described with the examples utilizing the sinusoidal waveform for the optical intensity modulation. Alternatively, other types of the optical intensity modulation may be used for varying the optical state of the displayed image with other modulation waveforms (composite waveforms) such as rectangular waveforms. In this optical intensity modulation, the above-mentioned condition needs to be satisfied by each of the sinusoidal wave components obtained through a Fourier transformation performed on the modulation waveform (composite waveform) used for generating the optical intensity modulation. In other words, the above-mentioned condition needs to be satisfied in the amplitude of each sinusoidal wave component at each frequency Although no limit is defined for the amplitude of each sinusoidal waveform in the above embodiment, the amplitude should preferably be equal to or greater than the increment threshold of human contrast perception. More specifically, this condition should be satisfied to ensure that the contrast variation in the displayed image would be recorded with an image-capturing apparatus.

The increment threshold of human contrast perception is defined as the minimum luminance difference that would be perceived as a contrast difference between an indicator and a lit background by the human vision system when the indicator is viewed in the lit background. The increment threshold of human contrast perception is a condition under which the contrast difference may be perceived when the original luminance is constant (still state) and not being modulated (dynamic state) as described above. When certain prescribed conditions are satisfied, the human vision system would not be able to perceive a change in the contrast, even if the contrast α were 100% during the optical intensity modulation.

The minimum sinusoidal waveform amplitude should be equal to or greater than the increment threshold of human contrast perception at the particular luminance level in the displayed image, because the sensitivity exhibited by the image-capturing apparatus such as the video camera in differentiating the optical intensity is not much different from the increment threshold of human contrast perception.

Therefore, recording of the contrast difference with the video camera may be ensured, if the optical intensity modulation amplitude were equal to or greater than the increment threshold of human contrast perception.

If the sensitivity in differentiating the optical intensity exhibited by the video camera or any other image-capturing apparatus that may be used for image/video piracy, is higher than the increment threshold of human contrast perception, the above-mentioned amplitude conditions should be determined theoretically based on the image-capturing characteristic of the video camera or any other image-capturing apparatus.

(A-2-2) Method for Generating Contrast Variation to Interfere With Viewing of Recorded Image Obtained Through Image-Capturing Conditions required for generating a contrast variation on a recorded image are described in the following section.

The image-capturing apparatus such as the video camera captures images periodically. For instance, images are recorded at a frequency of 60 Hz in a video camera based on the NTSC standard and at a frequency of 50 Hz with the PAL standard. The captured image corresponds to a luminous flux coming into an image-capturing device of the image-capturing apparatus and integrated over a period of time over which a shutter in the image-capturing apparatus stays open for each frame.

The integrated value for the recording optical intensity in each frame may be calculated with the following integral equation 2, when the optical intensity-modulated display image (i.e., displayed image having an optical state variation expressed with the above-mentioned function F(f, t)) is captured.

$$R(Nr) = \int_{Nr/Sr}^{Nr/Sr+Tr} F(f, t) dt \quad (2)$$

where R(Nr) is the recording optical intensity at frame Nr, Nr is the number of camera frames (Nr=0, 1, 2, . . . ), F(f,t) is the recording optical intensity of the optical intensity-modulated display image at time t, Sr is a sampling rate of the image-capturing apparatus, and Tr is a shutter speed of the image-capturing apparatus.

The following Equation 3 is obtained by substituting the Equation 2 into the above-mentioned Equation 1.

$$R(Nr) = A(1-\alpha)Tr + \frac{\alpha A}{2\pi f}\left\{\sin\left(2\pi f\left(\frac{Nr}{Sr}+Tr\right)\right) - \sin\left(2\pi f\left(\frac{Nr}{Sr}\right)\right)\right\} \quad (3)$$

where Nr=0, 1, 2 . . .

The first term in the Equation 3 represents the average optical intensity of the recorded image, and the second term indicates a temporal modulation component to be added to the first term. As indicated in the Equation 3, a variation determined by the parameters of the optical intensity modulation, such as frequency f and contrast α, and by the characteristics of the video camera (image-capturing apparatus) being used, such as sampling rate Sr and shutter speed Tr would be generated in the amplitude and temporal frequency of the optical intensity variation for each image-captured image.

The sampling rate Sr and the shutter speed Tr are the values determined by the image-capturing apparatus being used for image/video piracy. Once these values are determined, only the frequency f and the contrast α need to be determined in such a way that the basic frequency and amplitude for R(Nr) would be values equal to or greater than the temporal frequency contrast sensitivity of the human vision corresponding to the luminance of the displayed image.

In this embodiment, the flicker would be perceived by the human vision system in the recorded image obtained through image-capturing of the displayed image having gone through the optical intensity modulation, thereby enabling the interference with the viewing of the recorded image.

Accordingly, if the frequency f and the constrast α of the optical intensity modulation were to be selected appropriately so as to satisfy the conditions described in the previous Section (A-2-1) and the present Section (A-2-2), the flicker would be perceived when the recorded image obtained by image-capturing the original display image on the display screen is viewed, while no flicker would be perceived when the original display image is viewed directly.

Alternatively, the conditions described in the previous Section (A-2-1) may be waived, and only the condition described in the present Section (A-2-2) should be satisfied in order to interfere with the viewing of the recorded image obtained through unauthorized image-capturing, if a less than the highest quality image may be tolerated, as long as the flicker does not interfere too severely with the direct viewing of the image.

Figure 2:
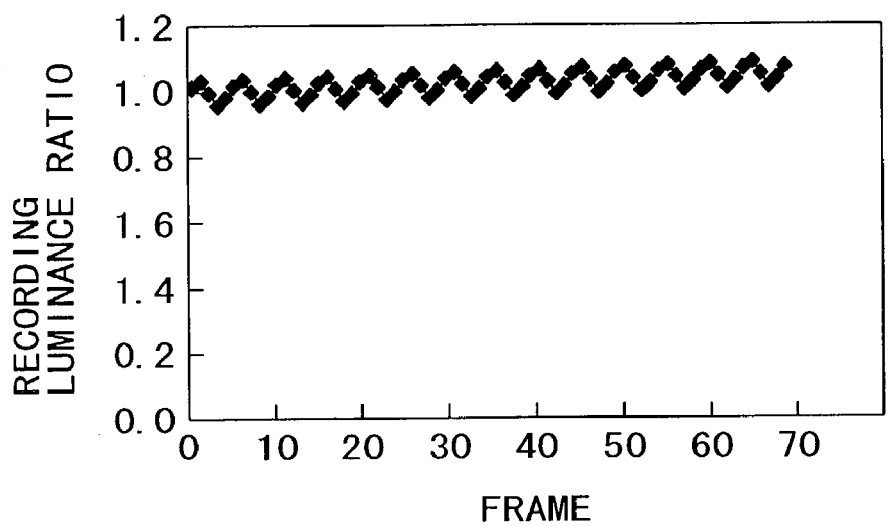
FIG. 2 is a graph showing an example of recording optical intensity appeared on a recorded image.

Next, the present embodiment will now be described with specific examples. In the following examples, it is assumed that the recorded image is obtained by image-capturing the optical intensity-modulated display image using the video camera based on the NTSC system. FIG. 2 shows changes in recording optical intensity obtained after the image-capturing, when a shutter opening period of the video camera is set at 1/60 of a second. The shutter opening for 1/60 of a second is a typical setting for an automatic shutter function used for the image-capturing performed in a dark movie theater as a movie is shown.

FIG. 2 indicates that the optical intensity variation with the contrast α of 3% and the basic frequency f of 12 Hz is recorded with the video camera. The contrast variation in the captured image (recorded image) is at a higher level than the temporal frequency contrast sensitivity of the human vision, as shown in FIG. 1. Accordingly, the flicker in the recorded image is perceived by the human vision system, and the viewing of the recorded image is interfered with the flicker in the recorded image. In other words, the flicker is perceived only by the viewer of the recorded image and not by the viewer of the displayed image, thereby realizing an interfering effect against image/video piracy.

The interfering effect is maximized when the shutter speed and the sampling rate of the image-capturing apparatus being used coincide with the respective values assumed in advance. If a different combination of shutter speed and sampling rate were used for the image-capturing, the amount of flicker in the recorded image may decrease in some cases. For instance, if the product of f and Tr were set at an integer number in the Equation 3, the flicker may be eliminated.

However, a complicated apparatus would be required to perform a fine adjustment in the shutter speed and the sampling rate. The fine adjustment may not be required for a typical case of image/video piracy. Alternatively, it would be possible to generate the flicker in the recorded image irrespectively of the shutter speed and the sampling rate of the image-capturing apparatus, if the frequency and/or amplitude of the optical intensity modulation were changed in the course of the display.

In the above-mentioned examples, the sinusoidal waveform is used for generating the optical intensity modulation. Alternatively, a modulation based on any other waveform may also be utilized to accomplish a similar effect. If a composite wave/pulse form were used for the modulation, the conditions of the present Section (A-2-2) and the previous Section (A-2-1) would need to be satisfied by at least one of the sinusoidal wave components obtained through a Fourier transformation, for instance, performed on the composite waveforms in order to generate the visible flicker in the recorded image by applying the optical intensity modulation on the displayed image, while generating no visible flicker for the viewer that is directly viewing the displayed image. If the highest image quality were not required for the displayed image that is viewed directly by the viewer, it may not be necessary to completely satisfy the condition described in the previous Section (A-2-1).

(A-2-3) Maintaining Display Luminance Before and After Optical Intensity Modulation An additional condition will now be described. The condition described herein is one of conditions to be satisfied to alleviate the sense of discomfort when the viewer is viewing the displayed image. When the optical intensity modulation satisfying the conditions described above is applied on the display image so as to accomplish a desired interfering effect, there is a chance that a display optical intensity different from a desired original display image may be presented due to a mismatch between the frequency of the optical intensity modulation and the frequency of a displaying system in use. In other words, the display optical intensity (optical state) in the frame may be different before and after the optical intensity modulation is applied. Here, the display optical intensity refers to as an averaged luminance over a period of a single frame.

Typically, the viewer of the displayed image is not aware of a change in the display optical intensity, since the viewer has no prior knowledge of what the original display optical intensity should be. However, the display optical intensity change may become an issue in some cases. For instance, a highly artistic image is displayed.

In this case, it would be necessary to keep the optical state unchanged in each frame of the display image, before and after the optical intensity modulation is applied The following equation has to be satisfied in order to maintain the same display optical state.

$$I(Np) = \int_{NpTp}^{(Np+1)Tp} F(f, t)\,dt \quad (4)$$

where I(Np) is the original display optical intensity before the optical intensity modulation is applied on a frame Np in the display apparatus in use. Here, Np=0, 1, 2..., and Tp is a time period for a single frame in the display apparatus in use.

The same image as the one obtained without the optical intensity modulation may be displayed, if the optical intensity modulation F(f, t) is designed to satisfy the condition of the present Section (A-2-3) as well as the conditions of the previous Sections (A-2-1) and (A-2-2). Incidentally, the condition defined by the Equation 4 is already satisfied by the specific example described in the previous Section (A-2-1) (the image frequency is set at 24 Hz, the optical state in a single frame before the optical intensity modulation is constant, and a sinusoidal waveform at a frequency of 72 Hz is used for the optical intensity modulation). In other words, an optical intensity modulation that only interferes with the viewing of the recorded image may be realized without generating the visible flicker to the viewer or causing any modification in the display image itself.

(A-3) Human Visual Characteristic With Respect to Color Variation

In one embodiment of the present invention, the focus is placed on a human visual characteristic with respect to a color variation. In this section, it will be shown that a similar effect as in the previous embodiment, in which the optical state was varied in luminance domain, may be realized by varying the optical state in color domain.

The optical state variation may also be realized by modulating a spectral distribution (color components) even as the optical intensity remains the same as in the original display image. For instance, when the modulation is performed in such a way that a red light of 100 cd/m² and a green light of 100 cd/m2 are displayed alternatively with the modulation frequency set at approximately 70 Hz, the human vision system may not separate the two colors and perceives only a mixture of these colors. In other words, no color variation would be visible to the viewer that is directly viewing the displayed image.

However, when the displayed image is captured using an image-capturing apparatus with a sampling rate of 60 Hz, time periods over which the red light is displayed and the green light is displayed in a single frame would be different in the recording. As a result, a color variation between the red and green at a lower modulation frequency (10 Hz in the present example) would be visible in the recorded image, thereby realizing an interfering effect that relies on an optical state variation in the color domain.

Figure 3:
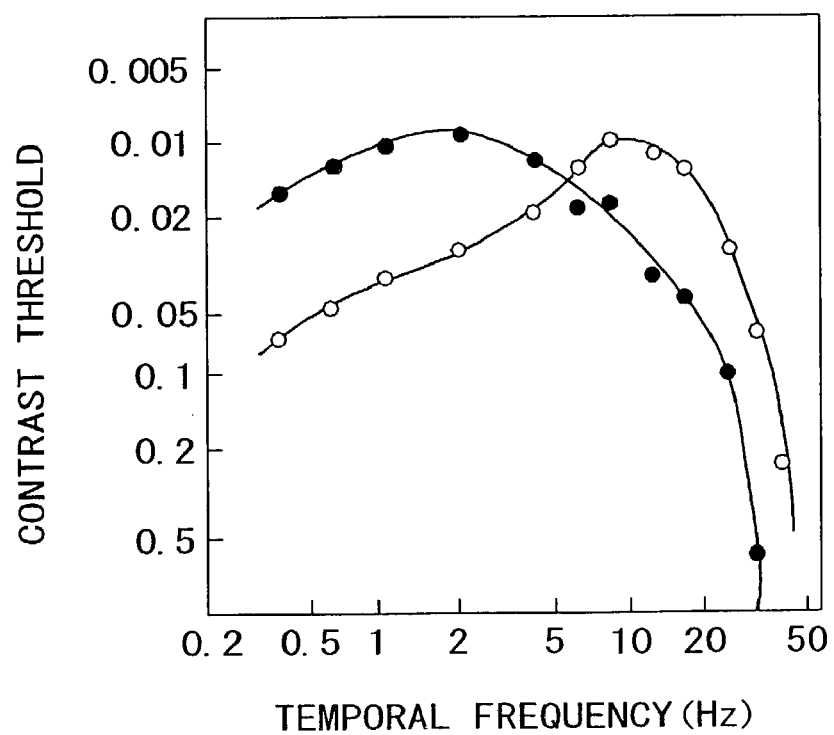
FIG. 3 is a graph showing a contrast sensitivity characteristic of human vision as a function of temporal frequency for different color states.

A specific example will now be described. FIG. 3 shows the contrast sensitivity of the human vision with respect to a color variation as a function of temporal frequency. In FIG. 3, a region above a characteristic curve (where the contrast variation is smaller) represents the contrast values at which no color variation wound not be perceived by the human vision system, and a region below the characteristic curve (where the contrast variation is larger) represents the contrast values at which the color variation would be perceived by the human vision system.

In FIG. 3, the characteristic curve with the symbols ● indicates the sensitivity characteristic for the green light (G) and the red light (R) modulated in opposing phases, so that a sum of luminance values of the two colored light beams would be constant, as shown in FIG. 4. Incidentally, a letter Y shown in FIG. 4 represents a yellow light. FIG. 4 shows how the mixture of the green light (G) and the red light (G) would look in a typical case.

When the displayed image having gone through the above modulation is captured with the image-capturing apparatus, a varying pattern of colors, changing from red to green and green to red, would become visible, although no luminance (corresponding to the contrast) variation would be visible in the recorded image.

It is a matter of course that conditions (amplitude and frequency) for the optical intensity modulation to be applied on each color may be determined in the same way as the contrast variation described in the previous Sections. The optical intensity modulation condition for each color is preferably selected in such a way that the selected optical intensity modulation would fall into a region in FIG. 3, in which the color variation would not be detected, when the displayed image is viewed directly, and into the other region in FIG. 3, in which the color variation would be detected in the recorded image captured with the image-capturing apparatus.

In the present embodiment, the luminance for the color mixture does not need to remain exactly the same after the optical intensity modulation is applied, as long as no interfering effect is perceived by the viewer that is directly viewing the displayed image. Obviously, an appropriate condition should be selected for maintaining the same luminance value before and after the optical intensity modulation, at need. The similar rationale as described in the previous Sections (A-2-1) to (A-2-3) may apply in the selection of the above conditions.

A characteristic curve with the symbols ○ is also shown in FIG. 3. This characteristic curve in FIG. 3 represents the sensitivity characteristic for a green light (G) and a red light (R) modulated with synchronized phases, as shown in FIG. 5. In this case, a color component ratio between the green light (G) and the red light (R) remains constant, and only the luminance (light-dark contrast) varies without a color variation. In other words, the contrast modulation described in the previous sections may be realized not only with the luminance variation but also with the color variation.

A comparison between the two characteristic curves in FIG. 3 shows a difference in temporal frequency characteristics. FIG. 3 indicates that a contrast variation (represented by the characteristic curve with the symbols ○) is perceived more easily by the human vision system than a color variation (represented by the characteristic curve with the symbols ●) at a higher frequency. In other words, a color variation is less visible than a contrast variation at a higher frequency. It means that an optical state variation in color domain would provide an effect of more practical use than an optical state variation in contrast domain at a lower frequency. Therefore, the optical state variation in color domain would be more readily usable in practical application, compared with the contrast variation.

(A-4) Other Modulation Methods

As described above, desired effects of the present invention may be accomplished by the optical state variation in both contrast domain and color domain. In the above optical state variation, the frequency of the optical intensity modulation to be applied does not need to be a constant.

For instance, a specific meaning may be assigned to a particular temporal frequency of the optical intensity modulation so as to provide information on the location and date/time of the display. Alternatively, if a specific meaning is assigned to a particular rule of temporal frequency change (for instance, a sequential order of the change) of the optical intensity modulation, the information relating to the display may also be provided by the way the temporal frequency of the optical intensity modulation changes. Furthermore, a specific meaning may also be assigned to the contrast itself or to the rule of contrast change.

The above information may be obtained, for instance, by providing a memory that stores the information relating to the display and the corresponding optical intensity modulation (combinations of temporal frequency and contrast), receiving information relating to the display from an input device, and reading out the corresponding type of the optical intensity modulation based on the inputted information.

Alternatively, the optical intensity modulation may be applied only on a part (spatial position) of the displayed image. The partial application of the optical intensity modulation may also provide the information relating to the display such as location and date/time of the display. The type of the optical intensity modulation corresponding to the information relating to the display may be read out by employing the similar system as that of the previous sections.

The application of the optical intensity modulation may involve a problem of causing decrease in the display luminance. In view of such a problem, a modulation method is proposed below. The modulation method is provided for applying an optical intensity modulation on a display image on single gray scale value basis so as to satisfy Conditions 1 to 3 described in the following section. This modulation method is proposed to realize a modulation technology for generating interfering noise (optical state variation independent of the original display image) that is perceptible when the recorded image obtained by image-capturing the original display image using an image-capturing apparatus or the like is viewed, while remaining imperceptible when the displayed image is directly viewed without using the image-capturing apparatus or the like.

Condition 1: In any given gray scale value of the display image, the optical intensity of the display image with the optical intensity modulation should be the value equal to or less than an allowable maximum optical intensity of the display apparatus.

Condition 2: For an optical intensity modulation performed at least one of the gray scale values of the display image, the frequency and amplitude in temporal domain of the optical intensity of each recorded frame obtained through image-capturing using the image-capturing apparatus or the like should be the values that fall into a region of the contrast sensitivities equal to or greater than the temporal frequency contrast sensitivity of the human vision system, or a region at which the flicker is perceptible to the human vision system.

Condition 3: An optical intensity modulation performed at any given gray scale value of the display image should fall into a region at which the amplitude of the modulation is a value equal to or less than the value derived from the temporal frequency contrast sensitivity of the human vision system or a region at which the flicker is not perceptible to the human vision system.

With the optical intensity modulation that satisfies the above Condition 1, the required maximum luminance of the displayed image to realize the optical intensity modulation would remain the same as the luminance of the original display image without the optical intensity modulation. Accordingly, a display apparatus with a greater maximum luminance does not need to accomplish the optical intensity modulation.

In addition, with the optical intensity modulation that satisfies the above Condition 2,the interfering noise is image-captured at least one of the gray scale values of the display image, thereby enabling the interference with the viewing of the recorded image.

Furthermore, with the optical intensity modulation that satisfies the above Condition 3, the viewer that is directly viewing the displayed image finds no difficulty in viewing the displayed image without perceiving any optical state variation applied in the displayed image.

Accordingly, by satisfying the above Conditions 1 to 3, there may be provided a modulation method, by which the optical state variation that interferes with the viewing of the recorded image obtained by image-capturing the original display image using the image-capturing apparatus or the like is generated in the recorded image, while no interfering effect is presented to the viewer of the direct viewing of the original display image, although the optical intensity modulation is applied on the original image signal. In addition, the above modulation method is effective in applying the optical intensity modulation without any reduction of the luminance of the displayed image.

A method for calculating the optical intensity F(f, t) of a display image generated from an image signal for a single frame using the optical intensity modulation that satisfies the above Conditions 1 to 3 will be described in the following section.

Figure 6:
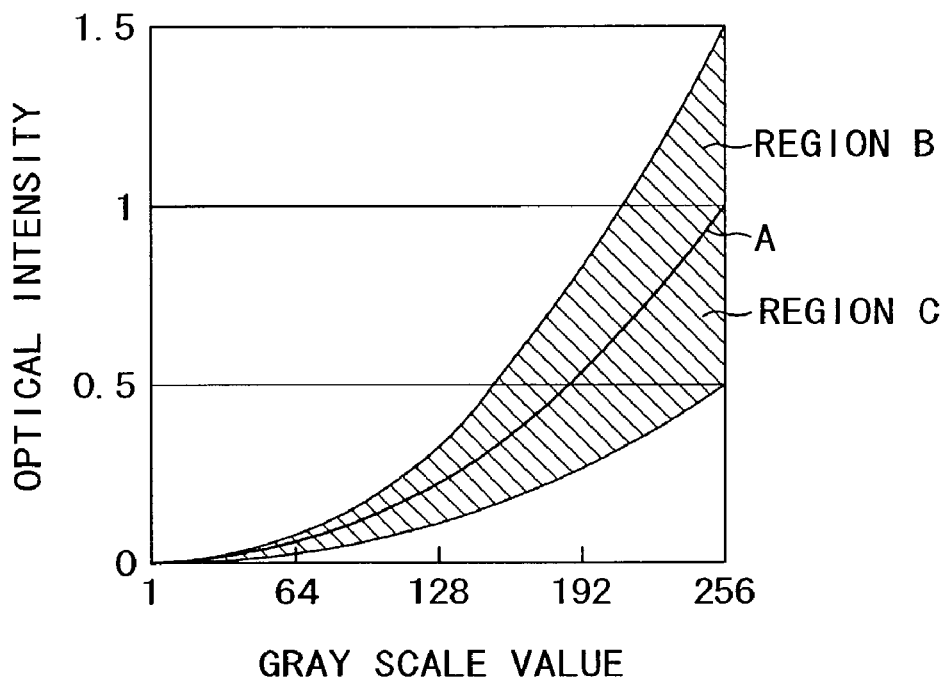
FIG. 6 is a graph showing a characteristic of an optical intensity of a display image generated from an image signal with respect to gray scale values of the display image when the optical state modulation is applied on the image signal in accordance with only an Equation 1.

FIG. 6 is a graph showing a characteristic of the optical intensity of a display image generated from an image signal with respect to gray scale values of the display image when the optical intensity modulation is applied on the display image in accordance with only the above Equation 1. It is assumed that that an optical intensity modulation with a constrast α of 0.5 and a frequency f of 67.5 Hz is applied, and the gray scale is set to 256 levels. A gamma correction value is assumed to be 2.2. The optical intensity of a display image generated from an image signal is scaled at the vertical axis of the graph in FIG. 6. The optical intensity scaled at the vertical axis of the graph is an optical intensity level obtained through normalization in which the optical intensity of a display image with the maximum gray scale value without the optical intensity modulation is set to 1. A curve represented by a solid line A in the graph of FIG. 6 indicates a relation between the optical intensity level of the display image generated from the image signal without the optical intensity modulation and the corresponding gray scale value thereof. The optical intensity resulting from the optical intensity modulation performed at each gray scale value varies at a region shown by slanted lines. In this case, the optical intensity modulation is provided so as that the average value of the optical intensity obtained at each gray scale value satisfies the relation shown by the curve A. A region B above the curve A indicates a lighter optical intensity than the optical intensity of the display image generated from the image signal without the optical intensity modulation. In contrast, a region C below the curve A indicates a darker optical intensity than the optical intensity of the display image generated from the image signal without the optical intensity modulation.

In the above described example, if the optical intensity of the display image generated from the image signal without the optical intensity modulation is equivalent to the maximum output of the display apparatus (e.g., 200 cd/m²) when the image signal without the optical intensity modulation is at the gray scale value of 256 (maximum level), as shown in FIG. 6, and if the display image were recorded using an image-capturing apparatus with a frame rate of 60 Hz, the conditions described in the previous sections (A-2-1) and (A-2-2) can be satisfied, thereby enabling the flicker to be generated only in the recorded image. The optical intensity modulation in a range of 100 cd/m² to 300 cd/m² at the gray scale value of 256 is required for the optical intensity output of the display image generated from the image signal with the optical intensity modulation. If this is the case, it is necessary to use a display apparatus that may generate optical intensity output up to a level of 300 cd/m2. In other words, the display apparatus needs to generate the optical intensity output one and a half times as much as the required optical intensity for the display apparatus in displaying an image signal. Accordingly, a more expensive display apparatus than a normally available is inevitably required.

Figure 7:
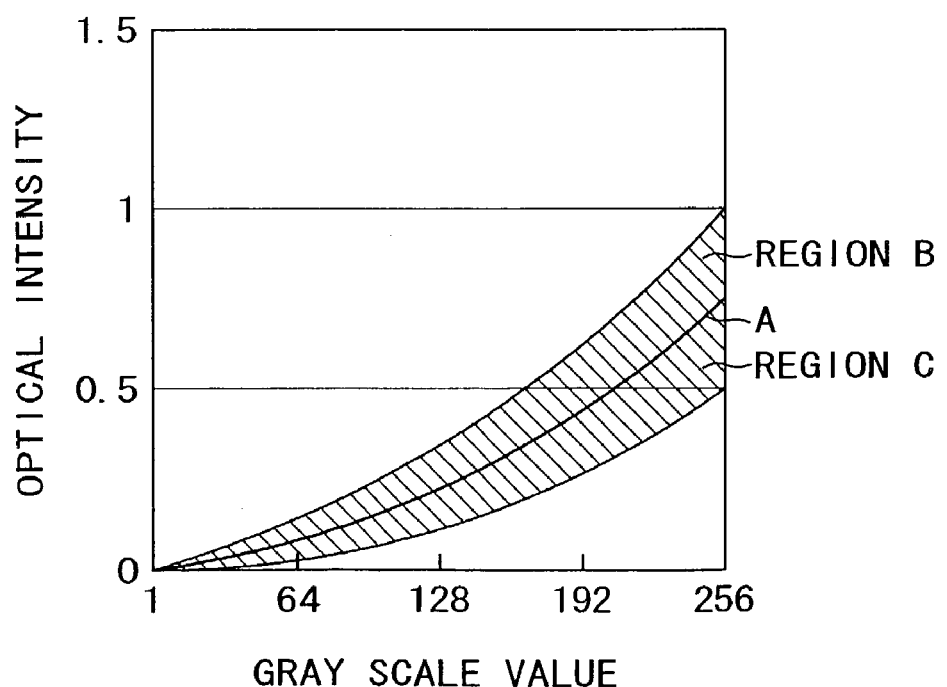
FIG. 7 is a graph showing a characteristic of an optical intensity of a display image generated from an image signal with respect to gray scale values of the display image when the optical intensity of the display image generated from an image signal with the optical intensity modulation is limited to the maximum output of a display apparatus.

In the above embodiment, when a display apparatus other than the display apparatus that can generate the optical intensity output up to the level of 300 cd/m² is used, the characteristic of the optical intensity of the display image generated from the image signal with respect to gray scale values of the display image is changed as shown in a graph of FIG. 7. In the graph of FIG. 7, a curve representing the gray scale value of the image signal with the optical intensity modulation is provided in a shape different from a curve representing the gray scale value of the image signal without the optical intensity modulation. When the curves respectively representing the gray scale values of the image signals are different from each other before and after the optical intensity modulation, it is likely that a quality of the image signal provided for the viewer would be degraded.

Figure 8:
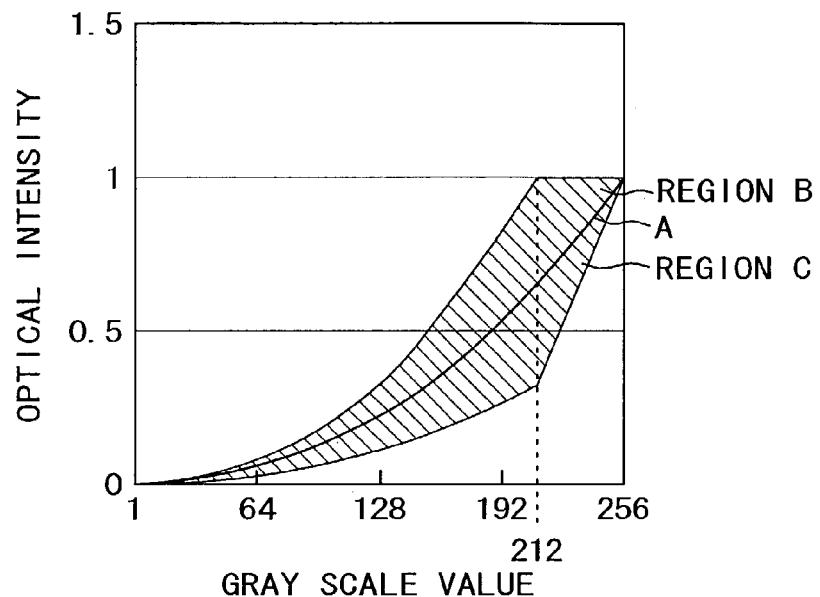
FIG. 8 is a graph showing a characteristic of an optical intensity of a display image generated from an image signal with respect to gray scale values of the display image when the optical intensity modulation is applied on the image signal in accordance with Equations 1 and 5.

A variety of methods may be utilized for applying the optical intensity modulation that satisfies the above Conditions 1 to 3. One of the above methods is, for instance, to calculate the optical intensity F(f, t) according to the above-mentioned Equation 1 when (Amax−A)>αA, while using the following Equation 5 for calculation of the optical intensity F(f, t) when (Amax−A)≦αA.

$$F(f,t)=A+(A\max-A)\times\cos(2\pi ft) \quad (5)$$

where A is the optical intensity of a display image generated from the image signal for a single frame without the optical intensity modulation, Amax is the maximum optical intensity of an optical intensity modulation apparatus being used, f is a frequency of the optical intensity modulation, $\alpha(0\leq\alpha\leq 1)$ is a contrast and t is a time. FIG. 8 shows an optical intensity-gray scale value characteristics of an image generated from an image signal.

In the embodiment shown in FIG. 6, the optical intensity modulation of the uniform sinusoidal waveform is merely applied with respect to all of the gray scale values on the display image generated from the image signal according to only the above-mentioned Equation 1. Instead, in the embodiment shown in FIG. 8, the optical intensity modulation of a sinusoidal waveform with different amplitudes is applied on single gray scale value basis on the display image generated from the image signal according to both the Equations 1 and 5. Furthermore, in the optical intensity modulation in FIG. 8, the optical intensity of the display image with the optical intensity modulation is determined not to exceed the optical intensity of the display image obtained at the maximum gray scale value before the optical intensity modulation. The optical intensity of the display image generated from the image signal is obtained through normalization with the optical intensity level set at 1 for the optical intensity of the display image with the maximum gray scale value before the optical intensity modulation. Accordingly, the optical intensity of the display image at any given gray scale value is equal to or less than 1 in the amplitude of the image signal with the optical intensity modulation. It means that the above Condition 1 is satisfied.

The amplitude of the optical intensity modulation that generates an optical state variation becomes smaller at a higher gray scale value of the display image. Thus, an interfering optical state variation in a recorded image obtained by capturing a display image portion with a higher gray scale value is more feeble, as compared with the optical intensity modulation that generates the uniform optical state variation for any given gray scale value of the display image. However, in the embodiment of FIG. 8, the interfering optical state variation in the recorded image obtained by capturing a display image with a gray scale value equal to or less than 212 is the same as in the optical intensity modulation that generates the uniform optical state variation for all of the gray scale values of the display image. Thus, it means that the above Condition 2 is satisfied. For instance, the interfering optical state variation in the recorded image obtained by capturing a display image with a gray scale value of 210 satisfies the condition described in the previous Section (A-2-2). A typical image has different gray scale values other than these higher gray scale values, thereby providing ample interfering effect for direct viewing of the recorded image. The positions at which the interfering effect is generated may be changed randomly for different display image contents. Accordingly, it maybe also expected to create a higher interfering effect in view of the human visual characteristic in which the human vision system is highly sensitive to variables.

Furthermore, in the optical intensity modulation that generates the uniform optical state variation for all of the gray scale values of the display image as shown in FIG. 6, the optical state variation generated at any given gray scale value of the display image satisfies the above Condition 3. Instead, in the modulation method of FIG. 8, the optical intensity modulation with a further smaller amplitude is required. In other words, a condition, which needs to be satisfied in this case, is more relaxed since the optical state variation in this case is less perceptible to the human vision system. Accordingly, no optical state variation is visible at all of the gray scale value of the display image to the viewer who is directly viewing the display image. Thus, it means that the above Condition 3 is satisfied.

(B) Specific Embodiments

Next, embodiments utilizing the above-mentioned basic principle will be described.

There are two types of systems for applying the optical intensity modulation on the display image. One of the systems is a system utilizing a display apparatus that projects an image onto a screen. The other is a system utilizing a display apparatus of direct view system.

In both systems, the optical intensity modulation may be applied in an optical path between the display apparatus and the viewer when the optical intensity modulation is not applied on an output light emitting from an optical source. Alternatively, the optical intensity modulation may be applied on the optical source or drive signals for the optical source, and the optical intensity of the output light from the optical source is modulated at the point of light emission. In yet another approach, the optical intensity modulation may be applied on the image signal. It is a matter of course that the optical intensity modulation may be applied to perform the modulation in either the contrast domain or the color domain.

(B-1) Examples of Projection Systems (a) First Example of Configuration

A display system functions as a system for applying an optical intensity modulation on a displayed image on a screen in such a way that an optical state variation independent of an original display image becomes visible in a recorded image obtained by image-capturing the displayed image on the screen, while presenting no interfering effect to the direct viewing of the displayed image on the screen, and that the maximum luminance of the displayed image may be maintained constant. The display system includes a display apparatus of projection system that projects a display image onto a screen, and an optical state modulation apparatus having a mechanism that controls an image signal of the display apparatus and applies a periodic optical intensity modulation in the temporal domain on the display image on single gray scale value basis.

(a-1) Specific Example 1

Figure 9:
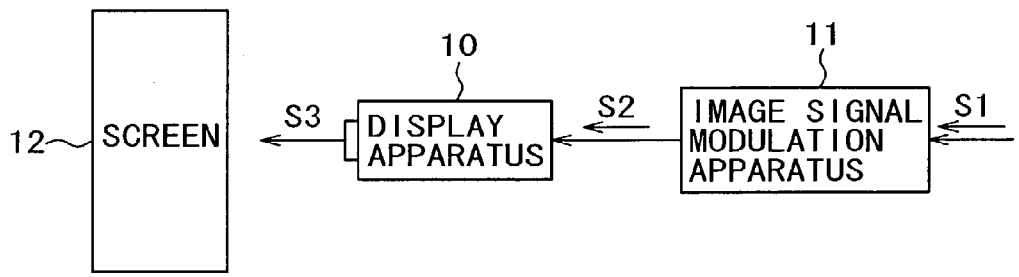
FIG. 9 shows a configuration example of a projection system (of image signal modulation type)

FIG. 9 shows a first specific example of the present display system. The system of FIG. 9 relates to a system for applying an optical intensity modulation on an image signal S1 inputted into the display apparatus 10.

As shown in FIG. 9, the present display system includes the display apparatus 10 and an image signal modulation apparatus 11, and an output signal of the display apparatus 10 is outputted to a screen 12. In the specific example of FIG. 9, the image signal modulation apparatus 11 is placed outside the display apparatus 10. Alternatively, the image signal modulation apparatus 11 maybe placed inside the display apparatus 10. The display apparatus 10 of the present display system may be of a non self-light emitting type or a self-light emitting type.

A variety of methods may be used to apply the optical intensity modulation on the image signal S1. In the present display system, there is employed a method for generating a plurality of identical frames with different optical intensities from a single frame and outputting these generated frames during the display period for the single frame. It should be noted that the single frame used herein is a unit of a display operation in the display apparatus.

Figure 10:
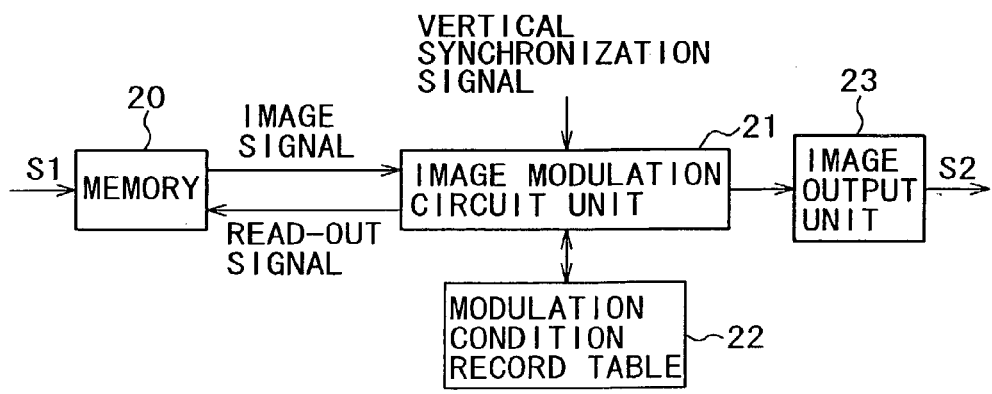
FIG. 10 shows a configuration example of an image signal modulation apparatus.

FIG. 10 shows a configuration example of the image signal modulation apparatus 11 that executes the above-mentioned modulation method. The image signal modulation apparatus 11 of FIG. 10 includes a memory 20, an image modulation circuit unit 21, a modulation condition record table unit 22 and an image output unit 23.

The memory 20 provides a temporary storage for the image signal inputted. The image modulation circuit unit 21 is a unit that performs, during the period between the reception of frame synchronization signal and the reception of the next frame synchronization signal, the processing of reading out the frame image data from the memory 20 a plurality of times (e.g., twice), and the processing of applying a predetermined optical intensity modulation on the frame image data read out. It is a matter of course that the frame image having gone through the optical intensity modulation is immediately outputted to the image output unit 23. In other words, the output frame image data is generated a plurality of times during the display period for the single frame.

The image modulation circuit unit 21 performs the above processing under an image intensity modulation condition that satisfies the above Conditions 1 to 3 described in the previous Section (A-4) after reading out data from the modulation condition record table unit 22 for each image signal gray scale value. It is a matter of course that the number of times the data in the memory 20 is accessed is also determined in accordance with the conditions used for the optical intensity modulation. Here, it is assumed that all information on the modulation conditions is stored in the modulation condition record table unit 22 in advance.

The image output unit 23 is a unit that outputs the image signal from the image modulation circuit unit 21 to the display apparatus 10. The image signal outputted from the image modulation circuit unit 21 to the image output unit 23 is an image signal resulting from the optical intensity modulation performed by the image modulation circuit unit 21.

As a result, the identical frame image data with different display optical intensity levels is inputted to the display apparatus 10 a plurality of times during the display period for the single frame.

In the above-mentioned example, the output frame rate of the image modulation circuit unit 21 is double the input frame rate. However, in the present example, it is not always necessary to limit the output frame rate to a multiple of the input frame rate. For instance, the input frame rate may be multiplied, instead, by any real number such as 1.5. When the input frame rate multiplied by 1.5 is used, time periods of the resulting frames will be generated with varying cycle times. Alternatively, it is also possible, for instance, to generate two output frames during a display period for one frame, and then generate three output frames during a display period for another frame. In the display apparatus 10, if an image signal for n frames were to be generated from the image signal for a single frame with the image modulation circuit unit 21, the generated image signal output would have a frame rate n times as much as the input frame rate.

Furthermore, when an image signal for a single frame is converted into a plurality of frames, the optical intensity of the respective frames may be set to different values from each other. It is a matter of course that the optical intensity modulation being applied in the present specific example should be determined so as to satisfy the modulation condition described in the previous Section (A-2). Accordingly, the viewing of the recorded image obtained by image-capturing the displayed image may be interfered, while no interfering effect would be visible in the displayed image when the displayed image is viewed directly. If the optical intensity modulation were determined so as to satisfy the modulation Conditions 1 to 3 described in the previous Section (A-4), without lowering the display luminance, the viewing of the recorded image obtained by image-capturing the displayed image would be interfered, while no interfering effect would be visible in the displayed image when the displayed image is directly viewed.

Figure 11:
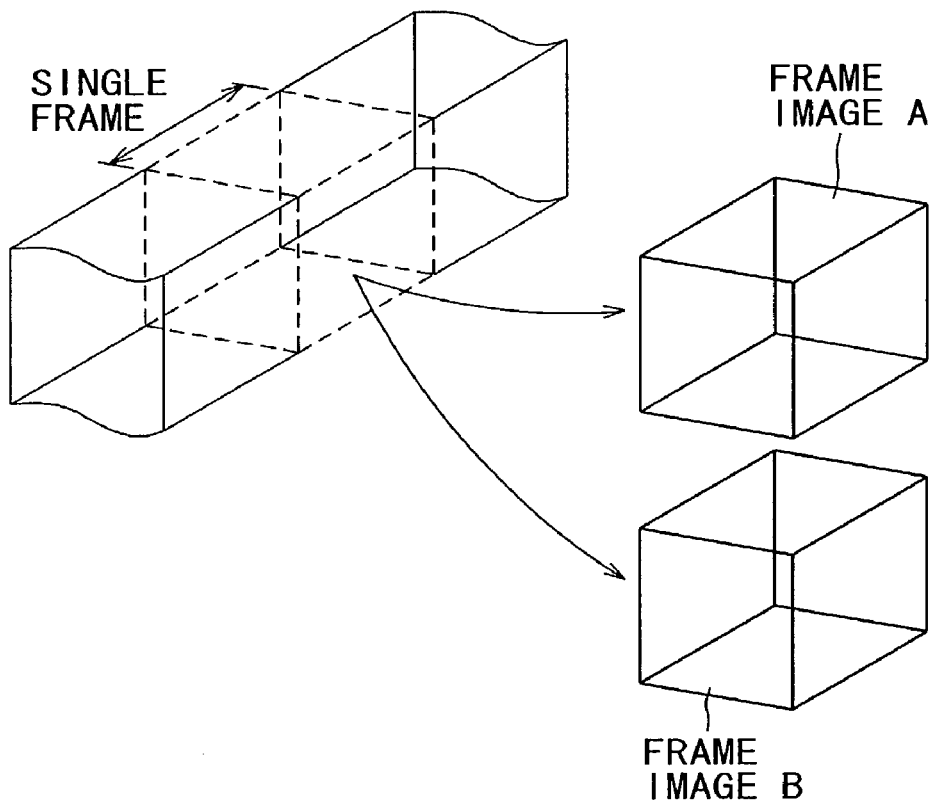
FIG. 11 is a schematic view showing a frame used for optical intensity modulation application by generating two sub-frames from a single frame.

A specific example of the optical intensity modulation will be described below. For instance, the image signal modulation apparatus 11 may read out a frame image A and a frame image B from a single frame as shown in FIG. 11. The image signal modulation apparatus 11 applies a lighter-modulation on the optical intensity of the generated frame image A and outputs the lighter-modulated frame image A to the display apparatus 10. In addition, the image signal modulation apparatus 11 applies a darker-modulation on the optical intensity of the generated frame image B and outputs the darker-modulated frame image B to the display apparatus 10. In order to output the inputted frame images A and B during the display period for a single frame, the display apparatus 10 needs to output the frame image data at a frame rate double the input frame rate. Thus, the viewer that is directly viewing the display image may view an average image between the frame images A and B. This average image is the same image as the frame image without the optical intensity modulation.

Alternatively, there may be provided a modulation method for splitting the image signal for a single frame read out from the memory 20 into a plurality of fields in the temporal domain, and applying the optical intensity modulation in the temporal domain on the image signal for these split fields.

Figure 12:
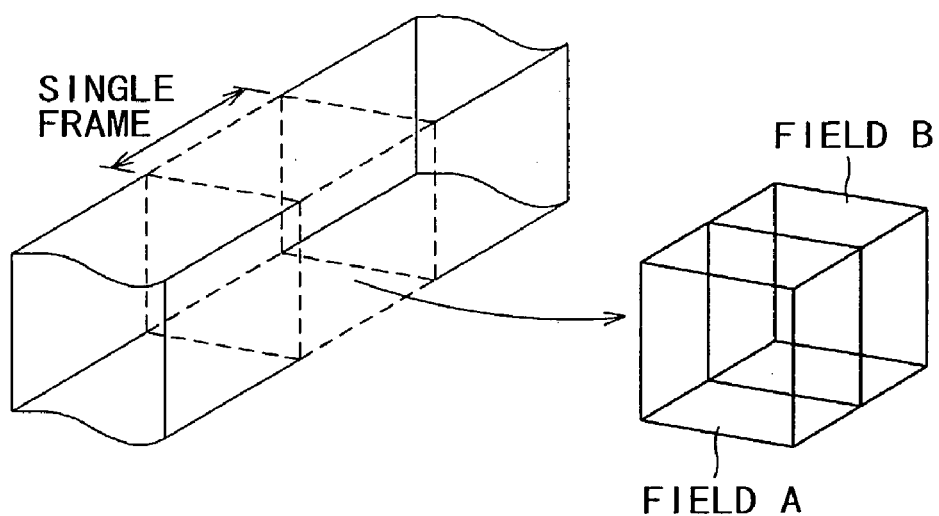
FIG. 12 is a schematic view showing a frame used for optical intensity modulation application by splitting a single frame into two fields.

Another specific example of the optical intensity modulation will be described below. For instance, the image signal modulation apparatus 11 may split a frame image of a single frame into a field A and a field B in the temporal domain, as shown in FIG. 12. The image signal modulation apparatus 11 applies a lighter-modulation on the optical intensity of the frame image in the field A and a darker-modulation on the optical intensity of the frame image in the field B, and outputs the modulated frame images in the fields A and B to the display apparatus 10. The display apparatus 10 outputs the inputted frame images in the fields A and B during the display period for the single frame. Thus, the viewer that is directly viewing the display image may view an average image between the frame images in the fields A and B. This average image is the same image as the frame image without the optical intensity modulation.

(b) Second Example of Configuration

In the present example, a display system functions as a system for applying an optical intensity modulation on a displayed image on the screen in such a way that an optical state variation independent of an original display image becomes visible in a recorded image obtained by image-capturing the displayed image on the screen, while presenting no interfering effect to the direct viewing of the displayed image on the screen. The present display system includes a display apparatus of a projection type that projects the display image onto the screen, a control apparatus that controls the image signal of the display apparatus, and an optical state modulation apparatus that applies, in an optical path between a point of light emission or a surface of light emission and the viewer, optical intensity modulations having a periodicity in the temporal domain at different spatial positions in the original display image on single gray scale value basis.

The present display system relates to a system for applying an optical intensity modulation in the optical path between the optical source and the viewer.

(b-1) Specific Example 1

FIG. 13 shows a first specific example of the present display system. The present display system of FIG. 13 relates to a method for applying an optical intensity modulation on a projection light at a position in front of a projection lens of a display apparatus 33.

As shown in FIG. 13, the present display system 1 includes a drive condition determination apparatus 30, a RAM 31, an image signal modulation apparatus 32, a display apparatus 33, an optical state modulation apparatus 34 and a drive control apparatus 35. An output signal of the optical state modulation apparatus 34 is outputted to a screen 36.

The drive condition determination apparatus 30 detects a luminance signal, a color signal, primary color signal or the like in the image signal S1. The drive condition determination apparatus 30 generates, based on the detected luminance or color signal, a conversion value selection signal S1$a$ to be outputted to the RAM 31 and a drive control signal S1$b$ to be outputted to the drive control apparatus 35.

The RAM 31 stores a plurality of modulation conditions for modulating the image signal S1 so as to convert it into a predetermined image signal S2. A predetermined modulation condition is selected in response to the conversion value selection signal S1$a$ inputted.

The image signal modulation apparatus 32 converts the image signal S1 into the predetermined image signal S2. More specifically, when the image signal S1 is inputted, the image signal modulation apparatus 32 accesses the RAM 31 and converts the image signal S1 into the predetermined image signal S2 in accordance with the conversion value selected in the RAM 31.

The display apparatus 33 has functions of converting the inputted image signal S2 into an image and magnifying the image optically, and projecting the image onto the screen 36. There are two ways to position the display apparatus 33. One is to position the display apparatus 33 in front of the screen 36 (on the viewer side), and the other is to position the display apparatus 30 behind a translucent screen (at a rear side). In the former arrangement, the display apparatus allows the viewer to view a light reflected at the screen surface, and a front projection-type display apparatus is employed. In the latter arrangement, the display apparatus allows the viewer to view a light transmitted through the translucent screen, and a rear projection-type display apparatus is employed. In the latter arrangement, it is likely that the translucent screen 36 and the present display system would be distributed as an integral unit in most cases.

The display apparatus 1 of this kind has a signal processing unit for processing an image signal, an optical source and an optical system for projecting the display image onto the screen 36. It is noted that the display apparatus 33 is available in various forms by utilizing various combinations of conventional technologies.

For instance, the display apparatus 1 may be realized with a CRT (Cathode Ray Tube) projector, a LCD (Liquid Crystal Display) projector, a LED (Light Emitting Diode Display) projector, a PDP (Plasma Display Panel) projector, a DLP (Digital Light Processing) projector, a FED (Field Emission Display) projector, an ILA (Image Light Amplifier) projector or the like. The DLP projector is a projector that utilizes a DMD (Digital Micro-mirror Device) as an image generation device.

The optical state modulation apparatus 34 provides a means for applying the optical intensity modulation on the projection light (display image) from the display apparatus 33. Accordingly, the optical state modulation apparatus 34 has a mechanism that is capable of controlling increase/decrease of the optical volume of the projected light projected from the display apparatus 33 onto the screen 36. The above mechanism may be realized by utilizing, as an optical intensity modulation element of the optical intensity modulation apparatus 34, a shutter device such as a mechanical shutter and a LCD shutter or a polarization device such as a polarization filter that may realize different optical intensity modulations at different spatial positions. Any of these devices may achieve the optical intensity modulation.

Although the optical state modulation apparatus 34 is placed immediately next to the projection lens in the example shown in FIG. 13, the position of the optical state modulation apparatus 34 is not limited to this position. The optical state modulation apparatus 34 may alternatively be placed in front or back of the optical source or in front or back of an image generator device such as a LCD panel, as long as the position of the optical state modulation apparatus 34 is in an optical path between the optical source and the viewer of the image light emitted from the optical source. It is obvious that the optical intensity modulation may be performed no matter where the optical state modulation apparatus 34 is placed. A layout shown in FIG. 13 offers an advantage in that the optical state modulation apparatus 34 may be easily attached on the existing display apparatus 33.

The drive control apparatus 35 is an apparatus that drives and controls the optical state modulation apparatus 34 so as to satisfy the modulation conditions defined in the previous Section (A-2). The drive control apparatus 35 generates a drive signal for driving the optical state modulation apparatus 34 in response to the drive control signal S1b generated from the drive condition determination apparatus 30. The specific processing steps executed by the drive control apparatus 35 may depend on the optical state modulation apparatus 34 being controlled. When the optical state modulation apparatus 34 includes the mechanical shutter or the LCD shutter, the opening and closing of the shutter are controlled. When the optical state modulation apparatus 34 is the mechanical shutter, the mechanical shutter is opened and closed by the drive control apparatus 35 that controls the speed and/or movement of members that shield off the projection light. On the other hand, when the optical state modulation apparatus 34 is the LCD shutter, the LCD shutter is opened and closed by the drive control apparatus 35 that controls the orientation of liquid crystal molecules.

Alternatively, if the polarization device such as a polarization filter is provided as the optical state modulation apparatus 34, the drive control apparatus 35 controls the polarization angles of a pair of polarization filters that are facing each other so as to apply the optical intensity modulation on the optical state that would be perceivable to the viewer. In such a case, one of the pair of polarization filters may be handed out to the viewer. Each of the viewers may put a pair of glasses with the polarization filter on.

The screen 36 may be a part of the present display system or may be omitted from the present display system. All or some of the components of the present display system may be packaged in a single casing and distributed as an integrated apparatus. The present display system may also be packaged in a plurality of units to compose one or more commercial products. Specifically, the display apparatus 33, the optical state modulation apparatus 34 and the drive control apparatus 35 may be packaged in separate casings and distributed separately. However, it is likely that these apparatuses would be packaged in a single casing in most cases, considering the way in which the present invention will be used.

The configuration and operation of the drive condition determination apparatus 30 will be described in the following. The drive condition determination apparatus 30 shown in FIG. 14 includes an image signal detector 40, a modulation condition determination unit 41, a selectable condition record table unit 42 and a control signal generator 43. The image signal detector 40 detects predetermined image information in the image signal S1, and outputs the detected image information to the modulation condition determination unit 41. For instance, the image information may include an average luminance value (or color value) for the entire display screen, an average luminance value (or color value) in a particular portion of the display screen, an integrated value calculated by assigning prescribed weight with respect to an optical intensity distribution in the display image and a color distribution or the like.

The selectable condition record table unit 42 records the combinations of modulation conditions that would generate the above-mentioned visual effect on the recorded image obtained by unauthorized image-capturing, using the image-capturing apparatus or the like, the image signal with the optical intensity modulation. The above modulation conditions may include the amplitude, the frequency and the waveform for different gray scale values for the optical intensity modulation performed by the optical state modulation apparatus 34, and the conversion value for different gray scale values for converting the image signal S1 into the image signal S2 that is outputted to the display apparatus 33.

The modulation condition determination unit 41 has access to the selectable condition record table unit 42 based on the inputted image information and determines the combination of the predetermined modulation conditions. The modulation condition determination unit 41 outputs the determined combination of the modulation conditions to the control signal generator 43. The control signal generator 43 converts the inputted modulation conditions into specific drive information. The drive signal generator 43 generates drive information suitable for the configuration used for the optical state modulation apparatus 34 and the control method for the drive control apparatus 35 for driving the optical state modulation apparatus 34. The control signal generator 43 provides a preliminary storage for a conversion table and/or a conversion equation for converting the inputted modulation condition into predetermined drive information and performs the conversion by referencing the conversion table and/or the conversion equation.

Alternatively, the drive condition determination apparatus 30 may output the generated conversion value selection signal S1a to the image signal modulation apparatus 32, instead of the RAM 31. In this case, the image signal modulation apparatus 32 selects a predetermined conversion value among the values in the RAM 31 in response to the inputted conversion value selection signal S1a, and converts the image signal S1 into the image signal S2.

(B-2) Example of Direct View System

A control method similar to the method used for the projection system may also be used for a direct view system. The following description will be given by placing the focus on the differences between the direct view system and the projection system.

(a) First Example of Configuration

In the present example, a display system functions as a system for applying an optical intensity modulation on a displayed image on a screen in such a way that an optical state variation independent of an original display image becomes visible in a recorded image obtained by image-capturing the displayed image on the screen, while presenting no interfering effect to the direct viewing of the displayed image on the screen, and that the maximum luminance of the displayed image may be maintained constant. The present display system includes a display apparatus of a direct view type that displays an image on a display screen, and an optical state modulation apparatus that applies a periodic optical intensity modulation in the temporal domain on the original display image for single gray scale value basis by influencing a display light.

The present display system relates to a method for applying the optical intensity modulation for different gray scale values of the display image in an optical path between an optical source and the viewer. When this type of display apparatus is in use, it is likely that the optical intensity modulation would often be applied in the optical path between the display screen (the screen on which the display image is displayed) and the viewer.

(a-1) Specific Example 1

FIG. 15 shows a first specific example of the present display system. The configuration in FIG. 15 corresponds to the configuration in FIG. 9, except that the screen 4 is removed. The display apparatus 10 used in the specific example 1 does not require a projection optical system.

The display apparatus 10 in the present display system maybe of a self-light emitting type or a non self-light emitting type. The display apparatus 10 may also be a head mount display. A variety of methods may be used for applying the optical intensity modulation on an image signal. In the present specific example, there maybe provided a method for generating a plurality of identical frames having different optical states from a single frame, and providing these output frames during the display period for the single frame. When this method is used, and the image signal modulation apparatus 11 having the configuration of FIG. 10 may be employed. The description on the control method for the image signal modulation apparatus 11 is the same as that given in the above-mentioned example of the projection type system.

(b) Second Example of Configuration

In the present example, a display system functions as a system for applying an optical intensity modulation on a displayed image on a screen in such a way that an optical state variation independent of an original display image becomes visible in a recorded image obtained by image-capturing the displayed image on the screen, while presenting no interfering effect to the direct viewing of the displayed image on the screen. The present display system includes a display apparatus of a projection type that projects a display image onto the screen, a controller apparatus that controls an image signal of the display apparatus and an optical state modulation apparatus that applies, in an optical path between a point of light emission or a surface of light emission and the viewer, the optical intensity modulation having a periodicity in the temporal domain at different spatial positions on the original display image for single gray scale value basis.

The present display system relates to a method for applying the optical intensity modulation in an optical path between the optical source and the viewer.

(b-1) Specific Example 1

Figure 16:
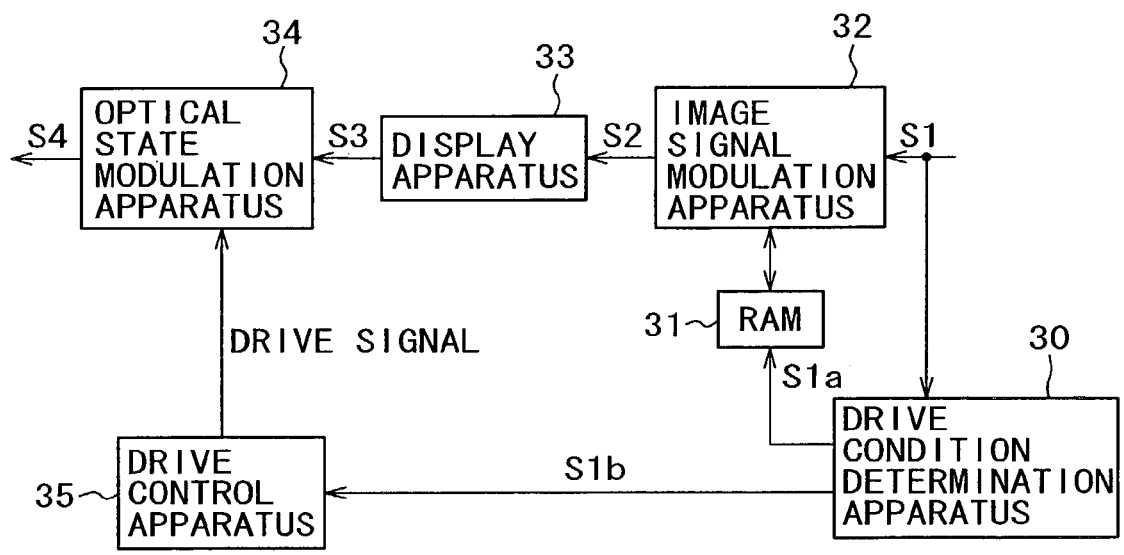
FIG. 16 shows a configuration example of a direct view system (of display light modulation type)
Figure 17:
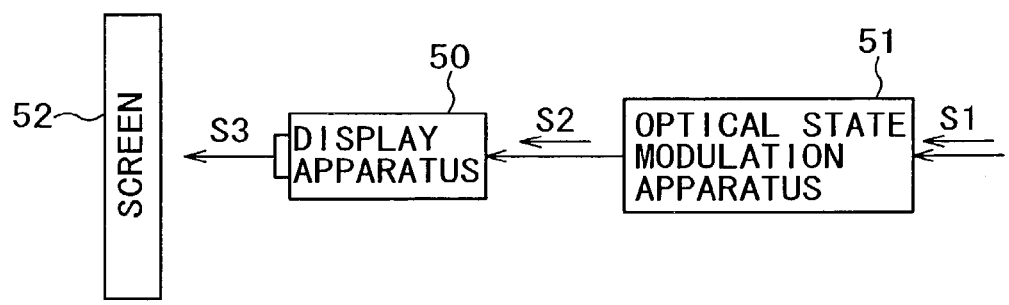
FIG. 17 shows a configuration example of a conventional optical state modulation apparatus.

FIG. 16 shows a first specific example of the present display system. The configuration in FIG. 16 is the same as the configuration in FIG. 13, except that the screen 36 is removed. The display apparatus 33 used in the first specific example does not require a projection optical system.

The display apparatus 33 may be realized with a CRT (Cathode Ray Tube) display, a flat panel display such as a LCD panel, a PDP panel, a FED (Field Emission Display), an EL (Electro-luminescence) display and others. The display apparatus 33 may also be a head mount display.

The optical state modulation apparatus 34 maybe realized with a mechanical shutter, a LCD shutter, a polarization device such as a polarization filter or any other optical filter. When the optical state modulation apparatus 34 is placed outside the display apparatus 33 as shown in FIG. 16, it is likely that the LCD shutter or the optical filter would be used in general. In the first specific example in FIG. 16, the optical state modulation apparatus 34 and the display apparatus 33 are provided as independent apparatuses. Alternatively, these apparatuses may be integrated into a single casing.

When the display apparatus 33 includes the image generation device and the optical source, the optical state modulation apparatus 34 may be placed between the optical source and the image generation device. The display apparatus 33 placed as described above also allows the viewer to perceive the displayed image having gone through the optical intensity modulation.

The drive control apparatus 35 may be the same as the drive control apparatus shown in FIG. 13. It is a matter of course that the control technique for the drive control apparatus 35 may vary depending on the configuration of the optical state modulation apparatus 34 as described above.

While the present invention has been particularly shown and described with reference to preferred embodiments according to the present invention, it will be understood by those skilled in the art that any combinations or subcombinations of the embodiments and/or other changes in form and details can be made therein without departing from the scope of the invention.

What is claimed is:

1. An optical state modulation apparatus, comprising:
   optical state modulation means for applying an optical intensity modulation in temporal domain on a display image generated from a inputted image signal on single gray scale value basis in such a way that the optical intensity modulation performed at least one of gray scale values of the display image falls into a region at which a flicker is perceptible to a human vision system when a recorded image obtained by image-capturing said display image is viewed, while remaining imperceptible to the human vision system when said display image is directly viewed;
   wherein said optical state modulation means provides the optical intensity modulation in such a way that, at each gray scale value, an average optical intensity of a display image generated from an image signal resulting from the optical intensity modulation performed is the same as an optical intensity of a display image generated from an image signal without the optical intensity modulation.

2. The optical state modulation apparatus according to claim 1, wherein said optical state modulation means provides the optical intensity modulation in such a way that the image signal resulting from the optical intensity modulation is an image signal of a value equal to or less than a maximum value of an image signal acceptable to a display apparatus being used.

3. The optical state modulation apparatus according to claim 1, wherein said optical state modulation means comprises:
   memory means for storing an image signal;
   reading-out means for reading out an image signal for a single frame from said memory means; and
   modulation means for applying an optical intensity modulation in temporal domain on a display image generated from the image signal readout for the single frame on single gray scale value basis in such a way that the optical intensity modulation performed at least one of gray scale values of the display image falls into a region at which a flicker is perceptible to a human vision system when a recorded image obtained by image-capturing said display image is viewed, while remaining imperceptible to the human vision system when said display image is directly viewed;
   wherein said modulation means provides the optical intensity modulation in such a way that, at each gray scale value, an average optical intensity of a display image generated from an image signal resulting from the optical intensity modulation performed is the same as an optical intensity of a display image generated from an image signal without the optical intensity modulation.

4. The optical state modulation apparatus according to claim 3, wherein said modulation means splits an image signal for a single frame read out by said reading-out means into a plurality of fields in the temporal domain, and modulates an optical intensity of each split field in the temporal domain.

5. The optical state modulation apparatus according to claim 3, further comprising:
   output means for outputting an image signal on which the optical intensity modulation is applied by said modulation means;
   wherein said modulation means generates a plurality of identical frames based on an image signal for a single frame read out by said reading-out means, and modulates the optical intensity of each generated frame in the temporal domain, and
   said output means outputs said plurality of identical frames, of which optical intensities are modulated, during a display period for the single frame.

6. The optical state modulation apparatus according to claim 3, wherein said optical state modulation means provides the optical intensity modulation according to the following function F(f,t);

$$F(f,t)=A+\alpha A \times \cos(2\pi f t) \ ((A\max-A) > \alpha A)$$

$$F(f,t)=A+(A\max-A) \times \cos(2\pi f t) \ ((A\max-A) \leq \alpha A)$$

where A is the optical intensity of a display image generated from an image signal for a single frame without the optical intensity modulation, Amax is a maximum optical intensity of a display image generated from a maximum value of an image signal acceptable to a display apparatus being used, f is a frequency for the optical intensity modulation, $\alpha(0 \leq \alpha \leq 1)$ is a contrast, and t is a time.

7. The optical state modulation apparatus according to claim 1, wherein said optical state modulation means provides the optical intensity modulation at a part or all of said gray scale values.

8. The optical state modulation apparatus according to claim 1, wherein said optical state modulation means provides the optical intensity modulation on said image signal at different spatial positions.

9. The optical state modulation apparatus according to claim 1, wherein said image signal is a luminance signal, and said optical state modulation means provides the optical intensity modulation on the display image generated from said luminance signal.

10. The optical state modulation apparatus according to claim 1, wherein said optical state modulation means provides the optical intensity modulation on at least one color of primary colors of a color display image generated from the image signal.

11. A display system, comprising:
    an optical state modulation apparatus for applying an optical intensity modulation in temporal domain on a display image generated from a inputted image signal on single gray scale value basis in such a way that the optical intensity modulation performed at least one of gray scale values of the display image falls into a region at which a flicker is perceptible to a human vision system when a recorded image obtained by image-capturing said display image is viewed, while remaining imperceptible to the human vision system when said display image is directly viewed; and
    a display apparatus for converting an output signal of said optical state modulation apparatus into a predetermined display signal, and displaying said display signal;
    wherein said optical state modulation apparatus provides the optical intensity modulation in such a way that, at each gray scale value, an average optical intensity of a display image generated from an image signal resulting from the optical intensity modulation performed is the same as an optical intensity of a display image generated from an image signal without the optical intensity modulation, and within a maximum optical intensity output range of said display apparatus.

12. The display system according to claim 11, wherein said optical state modulation apparatus comprises:

memory means for storing an image signal;

reading-out means for reading out an image signal for a single frame from said memory means; and modulation means for applying an optical intensity modulation in temporal domain on a display image generated from the image signal readout for the single frame on single gray scale value basis in such a way that the optical intensity modulation performed at least one of gray scale values of the display image falls into a region at which a flicker is perceptible to a human vision system when a recorded image obtained by image-capturing said display image is viewed, while remaining imperceptible to the human vision system when said display image is directly viewed;

wherein said modulation means provides the optical intensity modulation in such a way that, at each gray scale value, an average optical intensity of a display image generated from an image signal resulting from the optical intensity modulation performed is the same as an optical intensity of a display image generated from an image signal without the optical intensity modulation.

13. The display system according to claim 11, wherein said modulation means splits an image signal for a single frame read out by said reading-out means into a plurality of fields in the temporal domain, and modulates an optical intensity of each split field in the temporal domain.

14. The display system according to claim 11, further comprising:

output means for outputting an image signal on which the optical intensity modulation is applied by said modulation means;

wherein said modulation means generates a plurality of identical frames based on an image signal for a single frame read out by said reading-out means, and modulates the optical intensity of each generated frame in the temporal domain, and said output means outputs said plurality of identical frames, of which optical intensities are modulated, during a display period for the single frame.

15. The display system according to claim 11, wherein said optical state modulation apparatus provides the optical intensity modulation at a part or all of said gray scale values.

16. The display system according to claim 11, wherein said image signal is a luminance signal, and said optical state modulation apparatus provides the optical intensity modulation on the display image generated from said luminance signal.

17. The display system according to claim 11, wherein said optical state modulation apparatus provides the optical intensity modulation on at least one color of primary colors of a color display image generated from the image signal.

18. The display system according to claim 11, wherein said optical state modulation apparatus provides the optical intensity modulation on said image signal at different spatial positions.

19. The display system according to claim 11, wherein said display apparatus utilizes a raster scan system to display the image signal resulting from the optical intensity modulation performed by said optical state modulation apparatus.

20. The display system according to claim 11, wherein said display apparatus utilizes a X-Y dot matrix system to display the image signal resulting from the optical intensity modulation performed by said optical state modulation apparatus.

21. The display system according to claim 11, wherein said display apparatus is of a projection system or a direct view system.

22. The display system according to claim 11, wherein said optical state modulation means provides the optical intensity modulation according to the following function $F(f,t)$;

$$F(f,t) = A + \alpha A \times \cos(2\pi f t) \quad ((A\max - A) > \alpha A)$$

$$F(f,t) = A + (A\max - A) \times \cos(2\pi f t) \quad ((A\max - A) \leq \alpha A)$$

where A is the optical intensity of a display image generated from an image signal for a single frame without the optical intensity modulation, Amax is a maximum optical intensity of a display image generated from a maximum value of an image signal acceptable to a display apparatus being used, f is a frequency for the optical intensity modulation, $\alpha (0 \leq \alpha \leq 1)$ is a contrast, and t is a time.

23. An optical state modulation apparatus, comprising;

first optical state modulation means for applying a lighter-modulation in temporal domain on an optical intensity of a display image generated from a first image signal inputted on single gray scale value basis;

conversion output means for converting a second image signal, on which said first optical state modulation means applies the lighter-modulation on the optical intensity of said display image, into a predetermined third display signal and outputting said third display signal;

second optical state modulation means for applying a darker-modulation in temporal domain on an optical intensity of a display image generated from said third display signal resulting from the conversion performed by said conversion output means on single gray scale value basis in such a way that the optical intensity modulation performed at least one of gray scale values of the display image falls into a region at which the flicker is perceptible to a human vision system when a recorded image obtained by image-capturing said display image is viewed, while remaining imperceptible to the human vision system when said display image is directly viewed;

detection means for detecting image information in said first image signal; and control means for controlling said first optical state modulation means and said second optical state modulation means according to a modulation condition determined based on said image information;

wherein said control means provides a control in such a way that, at each gray scale value, an average optical intensity of a display image generated from a fourth display signal generated from said second optical state modulation means is the same as the optical intensity of a display image generated from said first image signal inputted into said first optical state modulation means.

24. The optical state modulation apparatus according to claim 23, wherein said first optical state modulation means includes a memory means for storing a plurality of lighter-modulation patterns used for applying the lighter-modulation on the optical intensity of the display image generated from the first image signal inputted, and the lighter-modulation pattern to be used for applying the lighter-modulation on the optical intensity of the display image generated from said first image signal inputted is determined in accordance with the modulation condition determined by said control means.

25. The optical state modulation apparatus according to claim 23, wherein said second optical state modulation means provides the optical intensity modulation at different spatial positions in the display image generated from said third display signal.

26. The optical state modulation apparatus according to claim 23, wherein said first optical state modulation means and said second optical state modulation means provide the optical state modulation at a part or all of the gray scale values.

27. The optical state modulation apparatus according to claim 23, wherein said first image signal is a luminance signal, and said first optical state modulation means and said second optical state modulation means provide the optical intensity modulation on the display image generated from said luminance signal.

28. The optical state modulation apparatus according to claim 23, wherein said first optical state modulation means and said second optical state modulation means provide the optical intensity modulation on at least one color of primary colors of a color display image generated from said first image signal.

29. The optical state modulation apparatus according to claim 23, wherein said conversion output means converts said second image signal into a display signal of raster scan system and outputs the display signal of raster scan system.

30. The optical state modulation apparatus according to claim 23, wherein said conversion output means converts said second image signal into a display signal of X-Y dot matrix system and outputs the display signal of X-Y dot matrix system.

31. A display system, comprising:
an optical state modulation apparatus including;
first optical state modulation means for applying a lighter-modulation in temporal domain on an optical intensity of a display image generated from a first image signal inputted on single gray scale value basis;
conversion output means for converting a second image signal, on which said first optical state modulation means applies the lighter-modulation on the optical intensity of said display image, into a predetermined third display signal and outputting said third display signal;
second optical state modulation means for applying a darker-modulation in temporal domain on an optical intensity of a display image generated from said third display signal resulting from the conversion performed by said conversion output means on single gray scale value basis in such a way that the optical intensity modulation performed at least one of gray scale values of the display image falls into a region at which the flicker is perceptible to a human vision system when a recorded image obtained by image-capturing said display image is viewed, while remaining imperceptible to the human vision system when said display image is directly viewed;
detection means for detecting image information in said first image signal; and
control means for controlling said first optical state modulation means and said second optical state modulation means according to a modulation condition determined based on said image information; and
a display apparatus for displaying a fourth display signal outputted from said second optical state modulation means in the optical intensity modulation performed at each gray scale value in said optical state modulation apparatus;
wherein said optical state modulation apparatus provides a control in such a way that an average optical intensity of a display image generated from said fourth display signal is the same as the optical intensity of a display image generated from said first image signal inputted into said first optical state modulation means.

32. The display system according to claim 31,
wherein said first optical state modulation means includes a memory means for storing a plurality of lighter-modulation patterns used for applying the lighter-modulation on the optical intensity of the display image generated from the first image signal inputted, and
the lighter-modulation pattern to be used for applying the lighter-modulation on the optical intensity of the display image generated from said first image signal inputted is determined in accordance with the modulation condition determined by said control means.

33. The display system according to claim 31, wherein said second optical state modulation means provides the optical intensity modulation at different spatial positions in the display image generated from said third display signal.

34. The display system according to claim 31, wherein said first optical state modulation means and said second optical state modulation means provide the optical state modulation at a part or all of the gray scale values.

35. The display system according to claim 31, wherein said first image signal is a luminance signal, and said first optical state modulation means and said second optical state modulation means provide the optical intensity modulation on the display image generated from said luminance signal.

36. The display system according to claim 31, wherein said first optical state modulation means and said second optical state modulation means provide the optical intensity modulation on at least one color of primary colors of a color display image generated from said first image signal.

37. The display system according to claim 31, wherein said conversion output means converts said second image signal into a display signal of raster scan system and outputs said display signal of raster scan system.

38. The display system according to claim 31, wherein said conversion output means converts said second image signal into a display signal of X-Y dot matrix system and outputs said display signal of the X-Y dot matrix system.

39. An optical state modulation method, comprising:
applying an optical intensity modulation in temporal domain on a display image generated from a inputted image signal on single gray scale value basis;
wherein the optical intensity modulation performed at least one of gray scale values of the display image falls into a region at which the flicker is perceptible to a human vision system when a recorded image obtained by image-capturing said display image is viewed, while remaining imperceptible to the human vision system when said display image is directly viewed, and
wherein, at each gray scale value, an average optical intensity of the display signal resulting from the optical intensity modulation performed is the same as the optical intensity of a display image generated from the image signal without the optical intensity modulation.

40. The optical state modulation method according to claim 39, comprising:
storing said image signal;
reading out an image signal for a single frame from the image signals stored; and applying an optical intensity modulation in temporal domain on a display image generated from the image signal readout for the single frame on single gray scale value basis;

wherein the optical intensity modulation performed at least one of gray scale values of the display image falls into a region at which a flicker is perceptible to a human vision system when a recorded image obtained by image-capturing said display image is viewed, while remaining imperceptible to the human vision system when said display image is directly viewed; and wherein, at each gray scale value, an average optical intensity of a display image generated from an image signal resulting from the optical intensity modulation performed is the same as an optical intensity of a display image generated from an image signal without the optical intensity modulation.

41. An optical state modulation method, comprising:

applying an optical intensity modulation in temporal domain on a display image generated from a inputted image signal on single gray scale value basis in such a way that the optical intensity modulation performed at least one of gray scale values of the display image falls into a region at which the flicker is perceptible to a human vision system when a recorded image obtained by image-capturing said display image is viewed, while remaining imperceptible to the human vision system when said display image is directly viewed, and that, at each gray scale value, an average optical intensity of the display signal resulting from the optical intensity modulation performed is the same as the optical intensity of a display image generated from the image signal without the optical intensity modulation;

converting an image signal that is optical intensity modulated into a display signal; and displaying said display signal on a display unit.

42. The optical state modulation method according to claim 41, comprising:

storing said image signal;

reading out an image signal for a single frame from the image signals stored; and applying an optical intensity modulation in temporal domain on a display image generated from the image signal readout for the single frame on single gray scale value basis;

wherein the optical intensity modulation performed at least one of gray scale values of the display image falls into a region at which a flicker is perceptible to a human vision system when a recorded image obtained by image-capturing said display image is viewed, while remaining imperceptible to the human vision system when said display image is directly viewed; and wherein, at each gray scale value, an average optical intensity of a display image generated from an image signal resulting from the optical intensity modulation performed is the same as an optical intensity of a display image generated from an image signal without the optical intensity modulation.

43. An optical state modulation method, comprising:

detecting image information from a first image signal inputted;

generating a second image signal by applying a lighter-modulation in temporal domain on an optical intensity of a display image generated from said first image signal on single gray scale value basis in accordance with a modulation condition determined based on said image information;

converting said second image signal into a predetermined third display signal; and applying, according to said modulation condition determined based on said image information, a darker-modulation in temporal domain on an optical intensity of a display image generated from said third display signal on single gray scale value basis in such a way that the optical intensity modulation performed at least one of gray scale values of the display image falls into a region at which the flicker is perceptible to a human vision system when a recorded image obtained by image-capturing said display image is viewed, while remaining imperceptible to the human vision system when said display image is directly viewed.

44. An optical state modulation method, comprising:

detecting image information in a first image signal inputted;

generating a second image signal by applying, in accordance with a modulation condition determined based on said image information, a lighter-modulation in temporal domain on an optical intensity of a display image generated from said first image signal on single gray scale value basis;

converting said second image signal into a predetermined third display signal;

generating a fourth display signal by applying a darker-modulation in temporal domain on an optical intensity of a display image generated from said third display signal on single gray scale value basis in such a way that the optical intensity modulation performed at least one of gray scale values of the display image falls into a region at which the flicker is perceptible to a human vision system when a recorded image obtained by image-capturing said display image is viewed, while remaining imperceptible to the human vision when said display image is directly viewed; and displaying said fourth display signal on a display unit.

* * * * *